US009860050B1

(12) United States Patent
Noolu et al.

(10) Patent No.: US 9,860,050 B1
(45) Date of Patent: Jan. 2, 2018

(54) DYNAMIC ANTENNA TUNING FOR FREQUENCY DIVISION DUPLEX

(71) Applicant: Amazon Technologies, Inc., Seattle, WA (US)

(72) Inventors: Rama Diwakara Rao Noolu, Sunnyvale, CA (US); Saranya Chandrasekaran, San Jose, CA (US); Adrian Napoles, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 339 days.

(21) Appl. No.: 14/571,959

(22) Filed: Dec. 16, 2014

(51) Int. Cl.
*H04W 24/02* (2009.01)
*H04L 5/14* (2006.01)
*H04W 72/04* (2009.01)

(52) U.S. Cl.
CPC .............. *H04L 5/14* (2013.01); *H04W 24/02* (2013.01); *H04W 72/0453* (2013.01)

(58) Field of Classification Search
CPC ....... H04L 5/14; H04L 5/0023; H04L 5/0032; H04L 5/0092; H04L 5/0064; H04L 5/0037; H04L 27/28; H04W 24/02; H04W 72/0453; H04W 72/0446; H04W 52/02; H04B 7/0413; H04B 7/04; Y02B 60/50
See application file for complete search history.

(56) References Cited

U.S. PATENT DOCUMENTS

| 7,796,963 B2 * | 9/2010 | Chang | H04B 1/0458 343/860 |
| 8,717,998 B2 * | 5/2014 | Choi | H04L 5/0023 370/329 |
| 8,826,363 B2 * | 9/2014 | Seo | H04N 21/44004 725/139 |
| 9,083,989 B2 * | 7/2015 | Eguchi | H04L 65/4076 |

FOREIGN PATENT DOCUMENTS

WO      2006089019 A1    8/2006

* cited by examiner

*Primary Examiner* — Pablo Tran
(74) *Attorney, Agent, or Firm* — Eversheds Sutherland (US) LLP

(57) ABSTRACT

Dynamic tuning of antennas towards a receive channel carrier frequency, a transmit channel carrier frequency, or between the receive channel and transmit channel carrier frequencies in frequency division duplex (FDD) communications systems is disclosed. A user device, such as a mobile communications device may be configured to dynamically tune its antenna based at least in part on the amount of data to transmit, data to receive, a receive channel quality, and/or a transmit channel quality. The antenna may be tuned to one of the transmit or receive channels or a frequency between the transmit and receive channels based at least in part on which channel, if any, may benefit from greater antenna efficiency.

20 Claims, 8 Drawing Sheets

DYNAMIC ANTENNA TUNING FOR FREQUENCY DIVISION DUPLEX

BACKGROUND

A variety of communications protocols and systems may use frequency division duplex (FDD) mechanism for wireless communications, particularly mobile communications. In FDD, the transmission of data from the user device (i.e., uplink) uses a different frequency band or channel than the receipt of data by the user device (i.e., downlink). The user device may have a single antenna and associated transceiver for the purposes of both receiving data via the receive (Rx) channel and transmitting data via the transmit (Tx) channel. The antenna, in this case, may be tuned such that its resonant frequency is at a frequency between the frequency band of the Rx channel and the Tx channel.

BRIEF DESCRIPTION OF THE DRAWINGS

The detailed description is set forth with reference to the accompanying figures. The use of the same reference numbers in different figures indicates similar or identical items; however, various embodiments may utilize elements and/or components other than those illustrated in the figures.

DETAILED DESCRIPTION

Figure 1:
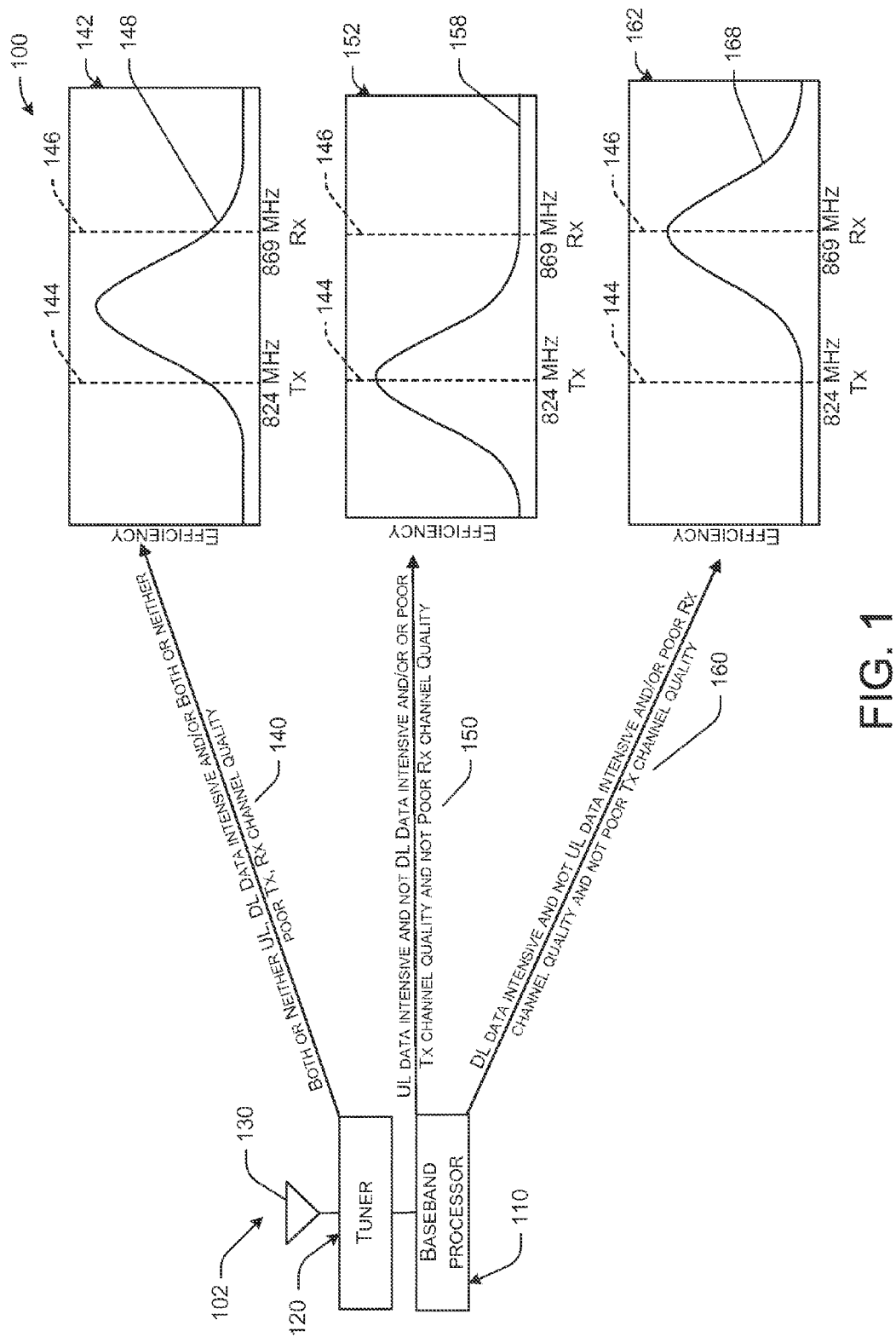
FIG. 1 is a schematic diagram that illustrates an example environment with a wireless communications system with an antenna and tuner that may be tuned to a Tx channel, a Rx channel, or intermediate between the Tx channel and the Rx channel, in accordance with example embodiments of the disclosure.

Example embodiments of the present disclosure may allow for dynamic tuning an antenna of a wireless communication system operating in a frequency division duplex (FDD) protocol, such as a full-duplex FDD mechanism. Dynamically tuning the antenna may enable relatively efficient transmission and reception of data via FDD. The wireless communications systems and methods, as described herein, may be configured to operate in any variety of suitable protocols and/or standards, such as wideband code division multiple access (WCDMA), long term evolution (LTE), or the like. In example embodiments, the wireless communications system may include an antenna coupled to a tuner and a baseband processor. In some aspects, the tuner may be tuned such that the resonant frequency of the antenna of the wireless communications system is substantially biased to the receive (Rx) or downlink (DL) channel of the wireless communication system. In some other aspects, the tuner may be tuned such that the resonant frequency of the antenna of the wireless communications system is substantially biased to the transmit (Tx) or uplink (UL) channel of the wireless communication system. In yet other aspects, the tuner may be tuned such that the resonant frequency of the antenna of the wireless communications system is substantially biased at a frequency within the frequency offset between the Rx and Tx channels of the wireless communication system. In example embodiments, uplink (UL) data to be transmitted, the downlink (DL) data to be received, and/or one or more channel quality metrics may be determined or estimated for the purpose of determining how the antenna is to be biased in the wireless communications system.

In example embodiments, if the expected amount of UL data is greater than a corresponding threshold amount, then the antenna may be biased to the Tx channel, or, in other words, the antenna may be tuned such that the antenna resonant frequency is substantially the same as the Tx carrier frequency. In example embodiments, the expected amount of DL data may be found to be below a corresponding respective threshold amount and the expected amount of UL data may be greater than a corresponding respective threshold amount, for the antenna to be biased toward the Tx channel. In the same or other example embodiments, biasing the antenna to the Tx channel may encompass tuning the antenna such that the transmit (Tx) channel carrier frequency lies within the bandwidth (BW) of the antenna (e.g., 3 dB roll-off bandwidth). In some of these example embodiments, the frequency response of the antenna may be such that when the antenna is biased to the Tx carrier frequency, the BW of the antenna may not encompass the Rx channel carrier frequency. It will be appreciated that by tuning the antenna to the Tx band, the wireless communications system may be configured to upload or transmit wireless signals and/or data with greater robustness (e.g., with greater radio frequency (RF) radiative energy), than if the antenna is biased between the Tx and Rx channel or if the antenna is biased at the Rx channel.

In example embodiments, if the expected amount of DL data is greater than a corresponding threshold amount, then the antenna may be biased to the Rx channel, or, in other words, the antenna may be tuned such that the antenna resonant frequency is substantially the same as the Rx carrier frequency. In example embodiments, the expected amount of UL data may be found to be below a corresponding respective threshold amount and the expected amount of DL data may be greater than a corresponding respective threshold amount, for the antenna to be biased toward the Rx channel. In the same or other example embodiments, biasing the antenna to the Rx channel may encompass tuning the antenna such that the Rx channel carrier frequency lies within the BW of the antenna. In some of these example embodiments, the frequency response of the antenna may be such that when the antenna is biased to the Rx carrier frequency, the BW of the antenna may not encompass the transmit channel carrier frequency. It will be appreciated that by tuning the antenna to the Rx band, the wireless communications system may be configured to download or receive wireless signals and/or data with greater robustness (e.g., with greater receive signal strength at the wireless communication system), than if the antenna is biased between the Tx and Rx channel or if the antenna is biased at the Tx channel.

In example embodiments, the tuning of the antenna with the tuner may be based at least in part on one or more channel quality parameters for the Rx and/or Tx channels. If it is found that the channel quality of the Rx channel is relatively poor compared to a corresponding threshold level for the Rx channel quality, then the antenna may be biased to the Rx channel carrier frequency. By doing so, the quality of the data received via the antenna and the Rx channel may be enhanced. In example embodiments, by tuning the antenna to the Rx channel, a greater received signal strength may be detected by the wireless communication system at the baseband processor. In a similar manner, if it is found that the channel quality of the Tx channel is relatively poor compared to a respective corresponding threshold level for the Tx channel quality, then the antenna may be biased to the transmit channel carrier frequency. By doing so, the data transmitted by the wireless communication system via the antenna and the Tx channel may be at a greater transmit power, thereby partially mitigating any infirmities associated with the Tx channel, such as Tx channel noise.

In some example embodiments, the DL and UL data may be relatively similar or it may not be possible to determine if the transmission of data or the receipt of data by the wireless communications system is to dominate. In other words, in these example embodiments, the DL and UL data may both be low (e.g., not data flow intensive on either channel) or may both be high (e.g., data flow intensive on both channels). Furthermore, in these or other example embodiments, the channel quality metrics for the Tx and Rx channel may not be substantially dissimilar to warrant biasing the antenna toward one of the Tx channel or Rx channel. In other words, the channel quality may be relatively acceptable for either channels or relatively poor for both channels. In these embodiments, the antenna may be biased at a frequency between the Tx carrier frequency and the Rx carrier frequency (e.g., within the frequency offset between the Rx and Tx channels).

In example embodiments, the wireless communications system may continuously and/or periodically identify the downlink and UL data loads and/or Rx and Tx channel quality to dynamically and/or continuously adjust the bias of the antenna. It will be appreciated, therefore, that the antenna may be biased toward the Rx channel, the TX channel, or neither the Rx channel nor Tx channel based on the current usage of the wireless communications system. For example, if the wireless communications system is engaged in downlink intensive tasks, where relatively large volumes of data are being downloaded, such as if the wireless communications system is being used to download streaming media content, then during approximately the time when the large volumes of data are being downloaded, the antenna may be biased at or near the Rx channel. Continuing with the example, if at a later time the wireless communications system is engaged in UL intensive tasks, such as uploading a large electronic mail (email) attachment, then at that time, the antenna may be biased at or near the Tx channel. Further still, if at a further subsequent time the wireless communications system is engaged in a relatively mixed UL and downlink use, then the antenna may be biased approximately within the frequency offset between the Rx and Tx channels.

The concepts described above may be understood with reference to FIG. 1. FIG. 1 is a schematic diagram that illustrates an example environment 100 with a wireless communications system 102 with an antenna 130 and tuner 120 that may be tuned to a Tx channel 144, a Rx channel 146, or intermediate between the Tx channel 144 and the Rx channel 146, in accordance with example embodiments of the disclosure. The baseband processor 110 may have access to a variety of information, such as the quantity of data that is to be transmitted, the quantity of data to be received, the quality of the Tx channel, and/or the quality of the Rx channel. The baseband processor 110 may receive this information in any suitable mechanism.

In example embodiments, the baseband processor 110 may be configured to access an uplink (UL) buffer and assess the occupancy (e.g., as total stored bits, as percentage of total capacity, etc.) to determine the amount and/or amount of data that is to be transmitted by the wireless communications system 102. In other example embodiments, the baseband processor 110 may be configured to receive an indication of the amount of data to be transmitted from another entity, such as an application processor of a user device in which the wireless communication system may be disposed and in which it operates. In still further example embodiments, the baseband processor 110 may be configured to identify an estimate of UL data based at least in part on the actual data transmitted via the wireless communications system 102 and/or based on UL grants offered by a base station with which the wireless communications system 102 communicates wirelessly. This information may, in some cases, be determined based at least in part on radio link control (RLC) protocol messages or packet data convergence protocol (PDCP) messages that may be exchanged by a user device in which the wireless communications system 102 may be disposed and in which it operates. Therefore, the baseband processor 110 may be configured to identify and/or estimate the amount of data to be transmitted using one or more of the aforementioned mechanisms.

The baseband processor 110 may further be configured to identify the one or more channel quality parameters associated with the Tx channel of the wireless communications system. In some cases, the baseband processor 110 may receive some indication of one or more of these Tx channel quality parameters. In other cases, the baseband processor 110 may be configured to measure one or more of these Tx channel quality parameters. The Tx channel quality parameters may include, but are not limited to, channel quality indicator (CQI), rank indicator (RI), precoding matrix index (PMI), signal to noise ratio (SNR), bit error rate (BER), combinations thereof, or the like.

In further example embodiments, the baseband processor 110 may be configured to determine the amount and/or amount of data that is to be received by the wireless communications system 102. The baseband processor 110 may be configured to receive an indication of the amount of data to be received from another entity, such as an application processor of a user device in which the wireless communication system may be disposed and in which it operates. Application(s) running on the application processor may indicate the amount of data that may be expected to be received via the wireless communications system 102. In still further example embodiments, the baseband processor 110 may be configured to identify an estimate of downlink data based at least in part on the actual data received via the wireless communications system 102 and/or based on downlink (DL) grants offered by a base station with which the wireless communications system 102 communicates wirelessly. This information may, in some cases, be determined based at least in part on RLC protocol or PDCP messages that may be exchanged by a user device in which the wireless communications system 102 may be disposed and in which it operates. Therefore, the baseband processor 110 may be configured to identify and/or estimate the amount of data to be received using one or more of the aforementioned mechanisms.

The baseband processor 110 may further be configured to identify the one or more channel quality parameters associated with the Rx channel of the wireless communications system. In some cases, the baseband processor 110 may receive some indication of one or more of these Rx channel quality parameters. In other cases, the baseband processor 110 may be configured to measure one or more of these Rx channel quality parameters. The Rx channel quality parameters may include, but are not limited to, receive signal strength indicator (RSSI), reference signal receive power (RSRP), reference signal code power (RSCP), reference signal receive quality (RSRQ), bit error rate (BER), signal to noise ratio (SNR), block error rate (BLER), Ec/Io value, combinations thereof, or the like.

As discussed above, the baseband processor may be configured to identify a variety of UL and DL data transfer amounts, as well as Tx and Rx channel quality metrics. In example embodiments, if data flow is both UL and DL data intensive, the data flow is neither UL nor DL data intensive, both Tx and Rx channel quality are poor, and/or neither Tx nor Rx channel quality are poor, the antenna 130 may be biased between the Tx band/carrier frequency 144 and the Rx band/carrier frequency 146. To determine the aforementioned conditions by the baseband processor 110, each of the UL data amount, DL data amount, the Tx channel metrics, and/or Rx channel metrics may be compared to corresponding respective threshold conditions or amount. In the chart 142, the antenna 130 may be biased, in this situation 140 such that the efficiency 148 of the antenna 130 is such that its peak efficiency lie between the Tx band 144 and the Rx band 146.

In the case where the data flow is UL data intensive and not DL data intensive or the Tx channel quality is relatively poor while the Rx channel quality is not relatively poor, the antenna 130 may be tuned by the tuner 120 in a manner where the efficiency 158 is such that the peak efficiency is located substantially near the Tx band 144 of the wireless communications system 102, as shown in chart 152. In this case 150, for example, the UL data may be greater than a threshold number of bits (e.g., 1 Mbit) that are to be transmitted or greater than a threshold percentage of UL buffer capacity (e.g., 95% of UL buffer capacity). Alternatively, a number or duration of UL grants from a base station (e.g., NodeB or eNodeB) may be greater than a corresponding respective threshold amount. Further still, one or more of the channel quality metrics for the Tx channel 144 may be less than a corresponding respective threshold amount, indicating poor transmission channel quality to cause the baseband processor 110 to direct the tuner 120 to bias the antenna 130 toward the transmission band 144, as shown in chart 152.

In the case where the data flow is DL data intensive and not UL data intensive or the Rx channel quality is relatively poor while the Tx channel quality is not relatively poor, the antenna 130 may be tuned by the tuner 120 in a manner where the efficiency 168 is such that the peak efficiency is located substantially near the Rx band 146 of the wireless communications system 102, as shown in chart 162. In this case 160, for example, the DL data may be greater than a threshold number of bits that are to be transmitted. Alternatively, a number or duration of downlink (DL) grants from a base station (e.g., NodeB or eNodeB) may be greater than a corresponding respective threshold amount. Further still, one or more of the channel quality metrics for the Rx channel 146 may be less than a corresponding respective threshold amount, indicating poor receive channel quality to cause the baseband processor 110 to direct the tuner 120 to bias the antenna 130 toward the receive band 146, as shown in chart 162.

Although the Transmit channel carrier frequency 144 and the Rx channel carrier frequency 146 are depicted as 824 MHz and 869 MHz, respectively, it will be appreciated that the Transmit channel carrier frequency 144 and the Rx channel carrier frequency may be any suitable values. Other non-limiting pairs of Tx and Rx carrier frequencies may include, 849/894 MHz, 1920/2110 MHz, 1850/1930 MHz, 1910/1990 MHz, 1710/1805 MHz, 1710/2110 MHz, etc. Various ones of the example Tx and Rx carrier frequencies may correspond to frequencies that may have been allocated, such as by standards bodies and/or regulatory bodies, for the purposes of LTE-based, WCDMA-based, or other suitable FDD-based communications. In some example embodiments, the transmit channel carrier frequency 144 may be greater than the Rx channel carrier frequency 146.

It will be appreciated that by thresholding the UL data, DL data, Rx channel quality metrics, and/or Tx channel quality metrics to determine the tuning of the antenna 130 enables the antenna 130 to be tuned to a band where there is a maximum amount of data being transacted, thereby enhancing the robustness of that process of transference of data. Alternatively or in addition, the antenna 130 may be tuned to the channel from among the Tx channel 144 and the Rx channel 146 that has poor channel quality. By doing so, the robustness of channel with poor channel quality may be enhanced. In other words, if the Tx channel 144 has poor channel quality, as determined by thresholding one or more metrics indicative of channel quality, then by tuning the antenna 130 to the Tx channel 144, the robustness and/or RF power of the transmission of data may be enhanced. Similarly, if the Rx channel 146 has poor channel quality, as determined by thresholding one or more metrics indicative of channel quality, then by tuning the antenna 130 to the Rx channel 146, the robustness and/or receive strength of the received data signals may be enhanced.

This brief introduction is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Figure 2:
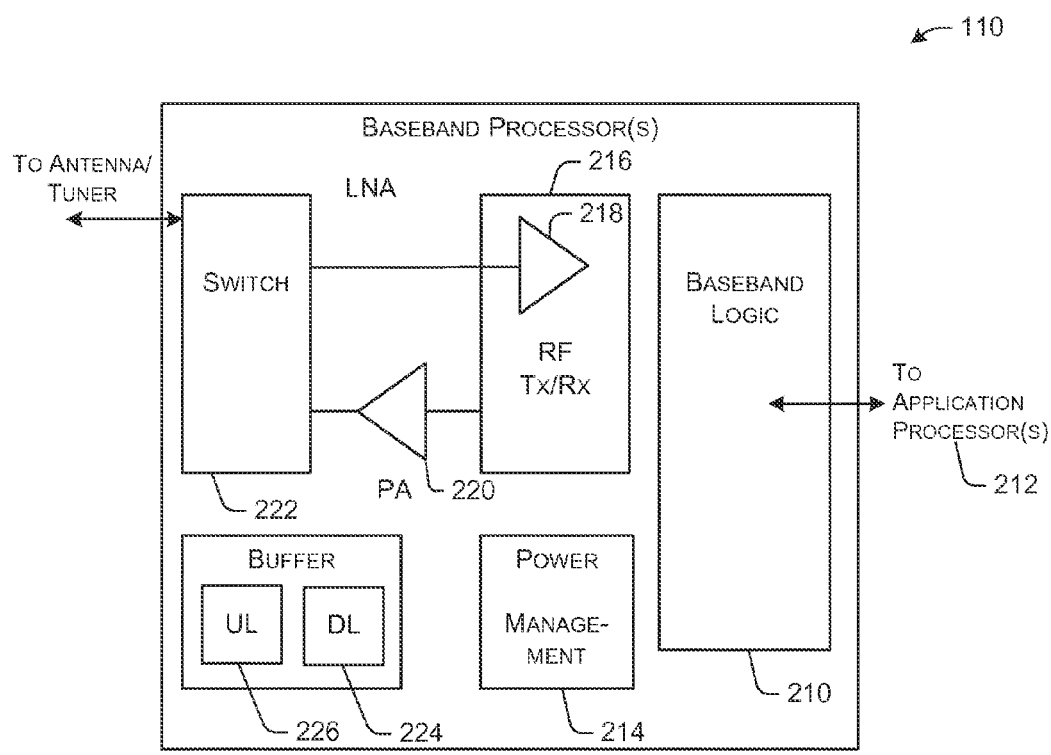
FIG. 2A is a circuit diagram that illustrates an example topology of the tuner of the wireless communications system of FIG. 1, in accordance with example embodiments of the disclosure.
FIG. 2B is a block diagram that illustrates an example baseband processor of the wireless communications system of FIG. 1, in accordance with example embodiments of the disclosure.

FIG. 2A is a circuit diagram that illustrates an example topology of the tuner 120 of the wireless communications system 102 of FIG. 1, in accordance with example embodiments of the disclosure. The tuner 120 may include one or more passive and/or active electronic elements, such as capacitors 200, 202 and inductors 204. As depicted, the capacitors 200, 202 may be variable capacitors, such as varactors. As such, the capacitance of one or more of the capacitors 200, 202 may be tuned to tune or modify an input impedance and/or an output impedance of the tuner 120. In example embodiments, a quiescent voltage (e.g., large signal voltage) may be applied across one or both of the capacitors 200, 202 to control their capacitance. In example embodiments, the capacitance of one or more of the capacitors 200, 202 may be modulated by control signal(s) provided by the baseband processor 110. These control signal(s) may be determined based at least in part on the frequency or range of frequencies to which the antenna 130 is to be tuned. The control signal(s) may continuously and/or periodically change as the baseband processor 110 dynamically updates the biasing of the antenna 130 based at least in part on factors such as channel usage, estimated channel usage, and channel quality.

The inductor 204 may be a variable inductance inductor. For example, the inductor 204 may be a variable tap inductor where the inductance can be tuned. According to example embodiments, the inductance of the inductor 204 may be modulated by control signal(s) provided by the baseband processor 110. These control signal(s) may be determined based at least in part on the frequency or range of frequencies to which the antenna 130 is to be tuned. The control signal(s) may continuously and/or periodically change as the baseband processor 110 dynamically updates the biasing of the antenna 130 based at least in part on factors such as channel usage, estimated channel usage, and channel quality.

It will be appreciated that while tuner 120 is depicted here as a "T" configuration for illustrative purposes, the tuner 120 may be implemented as any other suitable tuner and/or matching network configuration. For example, the tuner 120 may be implemented as a pi configuration. Additionally, in example embodiments, the tuner 120 may include elements, such as resistor(s) or active circuit element(s). Further still, in example embodiments, there may be any suitable number of fixed capacitance capacitors, fixed inductance inductors, variable capacitance capacitors, and/or variable inductance inductors. As a non-limiting example, a particular implementation of the tuner 120 may have a single fixed inductance inductor and a single variable capacitance capacitor. These circuit elements may be arranged in any suitable relative arrangement (e.g., parallel, series) such that the tuner 120 may be tuned to have a controllable, such as by the baseband processor(s) 110, input impedance and/or output impedance.

It should still further be noted that in alternative example embodiments, the physical dimensions of the antenna itself may be controllable and may be modulated to achieve a desired resonant frequency of the antenna. For example, a multi-segmented and tapped antenna configuration (e.g., variable linear array) may be used where the antenna length, and therefore, electrical characteristics of the antenna 130, including the antenna resonant frequency, may be controlled using one or more control signal(s) generated by the baseband processor 110. Other mechanisms of variable-length controllable antennas 130 may be implemented, such as micro-elctromechanical systems (MEMS) based antennas, micro/mini-motor actuation antennas, and/or electroactive polymer antennas. It will be appreciated that in one or more of these example embodiments, the variable length and/or otherwise resonant frequency controllable antenna may be implemented independently and directly connected to the baseband processor 110 or may operate in conjunction with the tuner 120, where part of the tuning may be performed by the tuner 120 and another part of the tuning may be performed by the tunable antenna.

FIG. 2B is a block diagram that illustrates an example baseband processor 110 of the wireless communications system 102 of FIG. 1, in accordance with example embodiments of the disclosure. The baseband processor 110 may include a baseband logic block 210 that may be configured to control the operations of the baseband processor 110. In example embodiments, the logic block 210 may be configured to communicate via bus 212 with and application processor, such as an application processor of a user device in which the wireless communication system 102 may be disposed. The logic block 210 may be configured to receive and send data to be transmitted via the Rx channel 146 and received via the Tx channel 144, respectively, from and to the application processor. The baseband processor 110 may include a variety of other elements including, but not limited to a power management block 214, a transceiver 216, a low noise amplifier (LNA) 218, a power amplifier (PA) 220, a switch 222, a buffer having a DL portion 224 and an UL portion 226, combinations thereof, or the like.

The power management block 214 may contain logic circuits and/or control circuits therein that may provide control functions associated with the power usage and management for the baseband processor 110. The power management block 214 may be configured to set one or more power settings of the baseband processor 110 and may control, at least in part, the transmit and/or receive signal amplification, as performed by the PA 220 and LNA 218, respectively. The poser management block 214 may, in example embodiments, be configured to modify the power amounts of data transmission based at least in part on the amount of power that may be available to the wireless communications system 102.

The transceiver 216 (e.g., transmitter and receiver) or radio may be configured to receive and encode and/or modulate data to be transmitted onto the Tx carrier frequency 144 and provide the resulting transmission signal to the PA 220 for amplification prior to transmission. In example embodiments, the transceiver 216 may be configured to receive the data to be transmitted from the uplink (UL) data buffer 226 that may cache data to be transmitted. The transceiver 216 (e.g., transmitter and receiver) or radio may be configured to receive and encode and/or modulate data to be transmitted onto the Tx carrier frequency 144 and provide the resulting transmission signal to the PA 220 for amplification prior to transmission. In example embodiments, the transceiver 216 may further include the LNA 218 providing signals that may be an amplified version of a data signal received via the antenna 130 of the wireless communications system 102 and carrying data to be received by the wireless communications system 102. The transceiver 216 may still further be configured to decode and/or demodulate the received data signal, as received using its LNA 218 to generate DL data received via the antenna 130. The transceiver 216 may still further be configured to store the received (DL) data in the DL buffer 224.

The LNA 218 may have passive and/or active electrical device(s) (e.g., metal-oxide-semiconductor field effect transistors (MOSFETs), bipolar junction transistors (BJTs), inductors, capacitors, resistors, etc.) and may be configured to receive a data signal via the antenna 130 and/or the tuner 120 and amplify the received data signal prior to providing the same to the transceiver 216. The LNA 218 may be configured to amplify and/or condition the signal to a amount where it is possible for the transceiver to decode and/or demodulate the received data signal from the antenna 130 carrying DL data via the Rx channel 146. In general, a relatively strong and/or low-noise signal received from the antenna 130 may result in a relatively robust signal generated at the output of the LNA 218 to be provided to the transceiver 216.

The PA 220 may have passive and/or active electrical device(s) (e.g., MOSFETs, heterojunction bipolar transistors (HBT), high-electron-mobility transistor (HEMT), etc.) and may be configured to amplify a transmit data signal modulated onto the Tx transmit carrier frequency 144 to be provided to the tuner 120 and/or the antenna 130 for the purposes of radiating the modulated data signal. In example embodiments, the PA 220 may consume a relatively high amount of power compared to other elements of the wireless communications system 102 or even elements of a user device in which the wireless communications system 102 is disposed.

The switch 222 may enable the transference of signals, such as modulated signals carrying data, to and from the antenna 130 and/or tuner 120. The switch 222 may further enable communicating additional signals, such as control signals from the baseband logic 210 to one or more elements of the tuner 120 and/or antenna 130. The one or more elements may include tunable passive elements, such as tunable antenna(s) 130, tunable capacitors 200, 202, and/or tunable inductors 204. As a result, the switch may, in example embodiments, serve as a conduit for control signals to the tuner 120 and or tunable antenna 130 (e.g., variable effective length antenna). In other example embodiments, the baseband logic the switch 222 may not be involved in transferring control signals from the baseband controller to tunable elements of the antenna 130 and/or the tuner 120. Instead, in those example embodiments, the control signals generated by the baseband logic 210 may be communicated directly to the tunable elements of the tuner 120 and/or antenna 130 or through other suitable conduits.

The DL buffer 224 may be a memory and/or storage device that may be configured to store downloaded data, such as data received via the antenna 130 over the Rx channel 146. The DL buffer 224 may be any suitable memory and/or storage device, such as any type of volatile memory and/or non-volatile memory. In example embodiments, the data stored in the DL buffer 224 may be transferred to an application processor, such as by accessing the data stored in the DL buffer 224 by one or more other entities, such as the baseband logic 210. In example embodiments, the baseband logic 210 may be configured to determine the amount and/or amount of data stored in the DL buffer 224, such as by accessing the DL buffer 224. In some cases, the baseband logic 210 may be configured to identify the volume of DL data stored in the DL buffer 224 as a total number of bits/bytes of data or as a percentage occupancy of the total capacity of the DL buffer 224. In example embodiments, the baseband logic 210 may be configured, by executing instructions, to threshold the volume of data stored in the DL buffer 224, such as relative to a total data threshold or a percentage occupancy threshold. Such thresholding may be utilized, in example embodiments, by the baseband logic 210 to identify the quantity of DL data and/or predict the whether a relatively high amount of data is to be received via the antenna 130 and the baseband processor 110.

The UL buffer 226 may be a memory and/or storage device that may be configured to store data to be uploaded, such as data to be sent via the antenna 130 over the Tx channel 144. The UL 226 buffer may be any suitable memory and/or storage device, such as any type of volatile memory and/or non-volatile memory. In example embodiments, the data stored in the UL buffer 226 may be transferred to an application processor, such as by accessing the data stored in the UL buffer 226 by one or more other entities, such as the baseband logic 210. In example embodiments, the baseband logic 210 may be configured to determine the amount and/or amount of data stored in the UL buffer 226, such as by accessing the UL buffer 226. In some cases, the baseband logic 210 may be configured to identify the volume of UL data stored in the UL buffer 226 as a total number of bits/bytes of data or as a percentage occupancy of the total capacity of the UL buffer 226. In example embodiments, the baseband logic 210 may be configured, by executing instructions, to threshold the volume of data stored in the UL buffer 226, such as relative to a corresponding total data threshold or a percentage occupancy threshold. Such thresholding may be utilized, in example embodiments, by the baseband logic 210 to identify the quantity of UL data and/or predict whether a relatively high amount of data is to be transmitted via the antenna 130 and the baseband processor 110.

The baseband logic 210 may be configured to control one or more other elements of the baseband processor 110 and/or elements of the tuner 120 and/or the antenna 130. The baseband logic 210 may, in example embodiments, be configured to communicate via bus 212 with one or more application processors, such as application processor(s) of a user device in which the wireless communications system 102 may be disposed. The baseband logic 210 may be configured to receive data to be transmitted (e.g., UL data) from the application processor(s). The baseband logic 210 may further be configured to store data received from the application processor(s) in the UL buffer 226. Additionally, the baseband logic 210 may be configured to direct transmission of data directly by providing the data from the application processor(s) to the transceiver 216 or by directing the transfer of the data from the UL buffer 226 to the transceiver 216. Still further, the baseband logic 210 may be configured to send data that is received (e.g., DL data) via the antenna 130 and transceiver 216 to the application processor(s). The baseband logic 210 may further be configured to store, such as temporarily cache, data received via the antenna 130 and transceiver 216 that is to ultimately be sent to the application processor(s) in the DL buffer 224. In example embodiments, the baseband logic 210 may be configured to direct transmission of data directly by providing the data from the transceiver 216 to the application processor(s) or by directing the transfer of the data from the DL buffer 224 to the application processor(s), such as via bus 212.

In example embodiments, the baseband logic 210 may be configured to access the UL buffer 226 to determine the amount of data stored therein. The amount of data may be determined by the baseband logic 210 as a total volume of data (e.g., number of bits or bytes) or as a percentage occupancy of the total capacity of the UL buffer 226. The volume of the data in the UL buffer 226 may be used by the baseband logic 210 to determine and/or estimate the direction of the data transmittance to/from the wireless communications system 102. In example embodiments, the baseband logic 210 may be configured to threshold the amount of data stored in the UL buffer 226 to a corresponding respective threshold (e.g., either a percentage occupancy threshold and/or a raw data amount threshold) to determine if the wireless communications system is likely to primarily transmit data via the antenna 130 over the Tx channel 144 or to primarily receive data via the antenna 130 over the Rx channel 146. As a non-limiting example, the baseband logic 210 may be configured to identify the percentage occupancy of the UL buffer 226 and compare it to a threshold amount of 90%. If the UL buffer occupancy is greater than 90%, then the baseband logic 210 may be configured to determine that the wireless communications system is likely to primarily be transmitting data via the Tx channel 144 rather than receiving data via the Rx channel 146 and, therefore, may cause the antenna to be biased toward to the Tx channel 144 to enhance the robustness of transmitting the data via the Tx channel 144.

The baseband logic 210 may further be configured to identify the amount of data that is being transmitted via the Tx channel 144 and use the same, such as by thresholding the amount of data being transmitted to predict if there is likely to be data that is to be transmitted via the Tx channel 144 during a future period of time. In some example embodiments, the baseband logic 210 may be configured to apply a moving average, a window summation/average, an infinite impulse response (IIR) filter, a finite impulse response (FIR) filter, and/or or the like, to a measure of the volume of data transmitted over time and threshold the results therefrom to identify the possibility of further transmission of data and whether the antenna 130 is to be tuned to the Tx channel 144.

The baseband logic 210 may still further be configured to identify a number of uplink (UL) grants by a base station with which the wireless communications system 102 is in communications and identify therefrom the likelihood of further data transmissions via the Tx channel 144 and whether the antenna 130 is to be tuned to the Tx channel 144. In still further example embodiments, the baseband logic 210 may be configured to receive a message from the application processor(s) indicative of how much data is to be transmitted via the Tx channel 144. This information from the application processor(s) may, therefore, be utilized by the baseband logic 210 to identify if the antenna 130 is to be biased to the Tx channel 144 to enhance the robustness of data transmission over the same. For example, if the message from the application processor indicates that a relatively high amount of data is to be transmitted over a future time period, such as determined by comparing to a corresponding threshold amount, then the baseband processor 110 may be configured to direct the antenna 130 to be biased to the Tx channel 144, such as by generating one or more control signals to tune one or more tunable elements of the tuner 120 and/or antenna 130. The application processor(s) may indicate to the baseband processor 110 that a relatively high amount of data is to be transmitted when transmission intensive applications may be operating, such as during media uploads (e.g., uploading pictures or videos), sending emails with relatively large attachments, sending a multimedia messaging service (MMS) message, or the like.

In further example embodiments, the baseband logic 210 may be configured to determine, such as by measuring and/or directing the measurement, of one or more Tx channel quality metrics of the transmission channel 144. These Tx channel quality metrics may be measured by any variety of elements of the baseband processor 110, applications processor(s), or any other suitable entity. The Tx channel metrics may include, but are not limited to, channel quality indicator (CQI), rank indicator (RI), precoding matrix index (PMI), signal to noise ratio (SNR), bit error rate (BER), combinations thereof, or the like. One, some, or all of these Tx channel quality metrics may be thresholded against a respective corresponding threshold amount to determine if the Tx channel quality is such that the antenna 130 is to be tuned to the Tx channel 144. As an non-limiting example, if the baseband logic determines that the BER of the Tx channel is $6.2 \times 10^{-3}$ and the corresponding threshold for the Tx channel BER is $4 \times 10^{-3}$, then it may be determined that the Tx channel quality is poorer than the BER threshold value allows and therefore, the antenna 130 may be biased toward the Tx channel 144. It will be appreciated that in some example embodiments, the Tx channel quality metrics may be considered in conjunction with the Tx channel load (e.g., one or more Tx channel quality metrics along with the UL data volume) may be thresholded to determine if the antenna 130 is to be biased to the Tx channel 144.

In certain example embodiments, the baseband logic 210 may be configured to access the DL buffer 224 to determine the amount of data stored therein. The amount of data may be determined by the baseband logic 210 as a total volume of data (e.g., number of bits or bytes) or as a percentage occupancy of the total capacity of the DL buffer 224. The volume of the data in the DL buffer 224 may be used by the baseband logic 210 to determine and/or estimate the direction of the data transmittance to/from the wireless communications system 102. In example embodiments, the baseband logic 210 may be configured to threshold the amount of data stored in the DL buffer 224 to a corresponding respective threshold (e.g., either a percentage occupancy threshold and/or a raw data amount threshold) to determine if the wireless communications system is likely to primarily transmit data via the antenna 130 over the Tx channel 144 or to primarily receive data via the antenna 130 over the Rx channel 146.

The baseband logic 210 may further be configured to identify the amount of data that is being received via the Rx channel 146 and use the same, such as by thresholding the amount of data being received to predict if there is likely to be data that is to be received via the Rx channel 146 during a future period of time. In some example embodiments, the baseband logic 210 may be configured to apply a moving average, a window summation/average, an infinite impulse response (IIR) filter, a finite impulse response (FIR) filter, and/or or the like, to a measure of the volume of data received over time and threshold the results therefrom to identify the possibility of further receiving of data and whether the antenna 130 is to be tuned to the Rx channel 146.

The baseband logic 210 may still further be configured to identify a number of downlink (DL) grants by a base station with which the wireless communications system 102 is in communications and identify therefrom the likelihood of further data download via the Rx channel 146 and whether the antenna 130 is to be tuned to the Rx channel. In still further example embodiments, the baseband logic 210 may be configured to receive a message from the application processor(s) indicative of how much data is to be received via the Rx channel 146. This information from the application processor(s) may, therefore, be utilized by the baseband logic 210 to identify if the antenna 130 is to be biased to the Rx channel 146 to enhance the robustness of data transmission over the same. For example, if the message from the application processor(s) indicates that a relatively high amount of data is to be received over a future time period, such as determined by comparing to a corresponding threshold amount, then the baseband processor 110 may be configured to direct the antenna 130 to be biased to the Rx channel 146, such as by generating one or more control signals to tune one or more tunable elements of the tuner 120 and/or antenna 130. The application processor(s) may indicate to the baseband processor 110 that a relatively high amount of data is to be received when download intensive applications may be operating, such as during media downloads (e.g., downloading pictures, websites, videos, and/or streaming media), receiving emails with relatively large attachments, receiving a multimedia messaging service (MMS) message, navigation, or the like.

In further example embodiments, the baseband logic 210 may be configured to determine, such as by measuring and/or directing the measurement, of one or more Rx channel quality metrics of the receive channel 146. These Rx channel quality metrics may be measured by any variety of elements of the baseband processor 110, applications processor(s), or any other suitable entity. The Rx channel metrics may include, but are not limited to, receive signal strength indicator (RSSI), reference signal receive power (RSRP), reference signal code power (RSCP), reference signal receive quality (RSRQ), bit error rate (BER), signal to noise ratio (SNR), block error rate (BLER), Ec/Io value, combinations thereof, or the like. One, some, or all of these Rx channel quality metrics may be thresholded against a respective corresponding threshold amount to determine if the Rx channel quality is such that the antenna 130 is to be tuned to the Rx channel 146. As a non-limiting example, if the baseband logic 210 determines that the RSSI of the Rx channel is −124 dBm and the corresponding threshold for the Rx channel RSSI is −120 dBm, then it may be determined that the Rx channel quality is poorer than the RSSI threshold value allows and therefore, the antenna 130 may be biased toward the Rx channel 146. It will be appreciated that in some example embodiments, the Rx channel quality metrics may be considered in conjunction with the Rx channel load (e.g., one or more Rx channel quality metrics along with the DL data volume) may be thresholded to determine if the antenna 130 is to be biased to the Rx channel 146.

It will be appreciated that often times the wireless communications system 102 may be operational in a portable mobile communications device operating from battery power, and therefore, the management of power may be a useful function in enhancing the user experience of the mobile device in which the wireless communication system 102 is disposed. As a result, and additionally due to any regulatory restrictions in any variety of jurisdictions where the wireless communications system 102 may be operated, there may be a lack of flexibility in merely increasing the transmit power or receive amplification of signals carrying data from/to the wireless communications system 102. Therefore, it may not be possible and/or practical, in example embodiments, to merely increase the amplification at the PA 220 and/or LNA 218 to ameliorate any quality deficiencies with either the Tx or Rx channels 144, 146, or to enhance the robustness of the channel that may be in relatively high use. As a result, by shifting the resonant frequency and/or bandwidth of the antenna 130 by tuning the tuner 120 and/or the antenna, greater efficiency may be realized from one of the Tx channel 144 or the Rx channel 146 as warranted based at least in part on the direction of data flow and the quality of each of the channels 144, 146. In other words, by selectively tuning the antenna to or near the frequency of the Tx channel 144 or the Rx channel 146, a greater robustness of data transfer via the channel 144, 146 to which the antenna 130 is tuned may be realized in the wireless communications system 102, while still benefiting from the advantages of FDD. It should be noted that in example embodiments, relatively significant efficiency gains, such as on the order 2 dB or more, may be achieved on either the Tx channel 144 or the Rx channel 146 by tuning the antenna to or close to either the Tx channel 144 or the Rx channel 146, rather than somewhere between the Rx channel 146 and the Tx channel 144.

Figure 3:
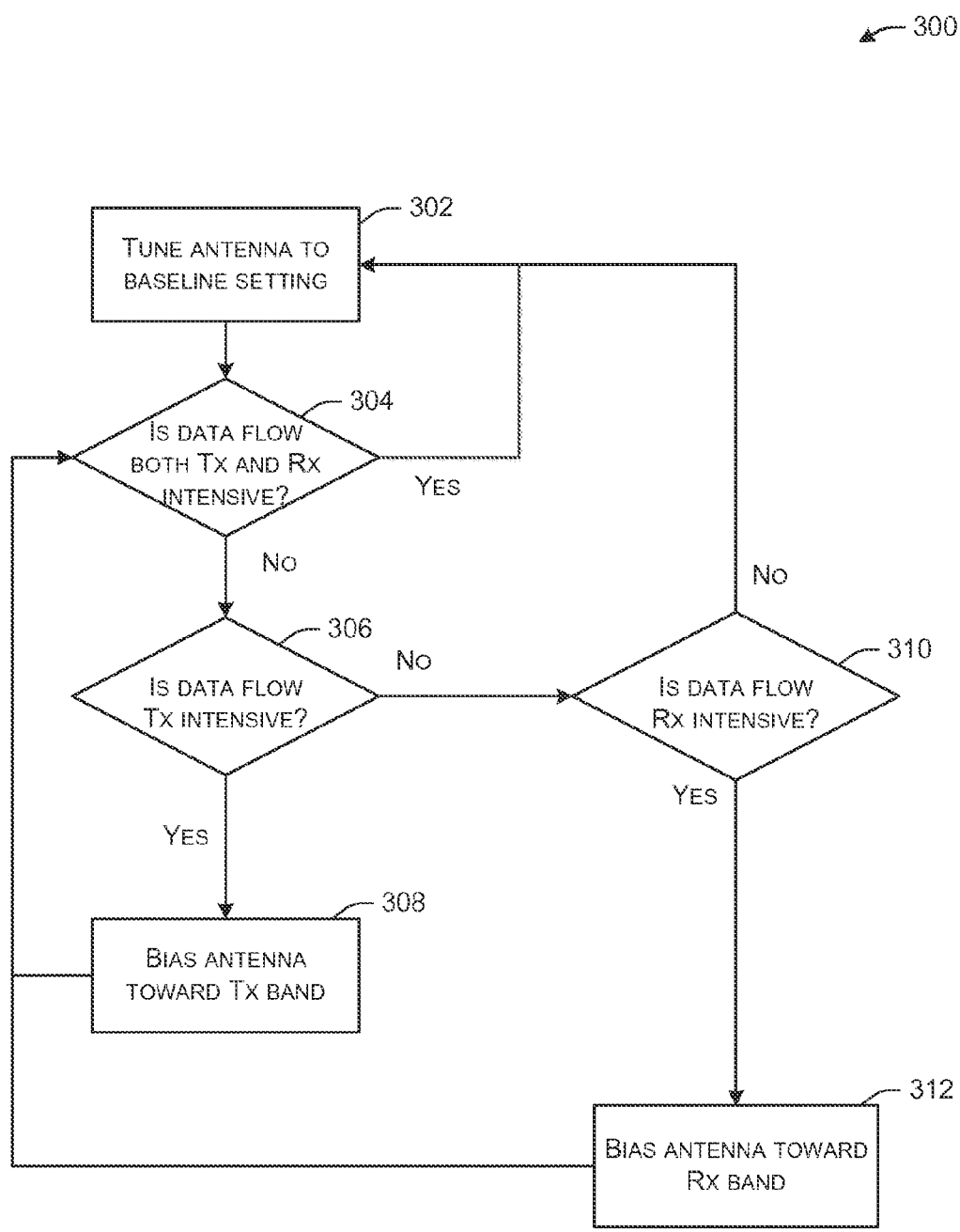
FIG. 3 is a flow diagram illustrating an example method for biasing the antenna of the wireless communications system of FIG. 1, in accordance with example embodiments of the disclosure.

It will also be appreciated that if the baseband logic 210 determines that the magnitude of DL data flows and the magnitude of the UL data flows are not skewed in one direction of the other, the baseband logic 210 may be configured to cause the antenna 130 to be biased such that the resonant frequency of the antenna 130 lies at a frequency between the frequency of the Tx band 144 and the frequency of the Rx band 146, such as, for example, half-way between the Tx band frequency 144 and the Rx band frequency. In this case, the baseband logic 210 may be configured to generate and/or provide one or more control signals to tunable elements of the tuner 120 and/or the antenna 130 such that the bandwidth of the antenna is substantially between the transmit channel carrier frequency 144 and the Rx channel carrier frequency 146. Similarly, in example embodiments, if neither the Rx channel quality nor the Tx channel quality are degraded enough to trigger a threshold condition, the baseband logic 210 may again be configured to cause the antenna 130 to be biased such that the resonant frequency of the antenna 130 lies at a frequency between the frequency of the Tx band 144 and the frequency of the Rx band 146. In some cases, the point FIG. 3 is a flow diagram illustrating an example method 300 for biasing the antenna 130 of the wireless communications system 102 of FIG. 1, in accordance with example embodiments of the disclosure. The method 300 may be performed by the baseband processor 110 in conjunction with the tuner 120 and the antenna 130.

At block 302, the antenna may be tuned to a baseline setting. The baseline setting, in example embodiments, may be such that the resonant frequency of the antenna 130 is within the frequency offset (e.g., between the Rx band 146 and the Tx band 144). In some cases, the baseline setting may be substantially half-way between the Rx carrier frequency 146 and the Tx carrier frequency 144. In other cases, the baseline setting of the antenna may be skewed either to closer to the Tx channel 144 or the Rx channel 146 within the frequency offset. At this tuner 120 and/or antenna biasing, the efficiency of the wireless communications system may not be optimized for either the Tx channel 144 or the Rx channel 146, but may display relatively less than optimal performance for both the Tx channel 144 and the Rx channel 146, such as in full-duplex operation.

At block 304, it may be determined if the data flow via the antenna 130 by the baseband processor 110 is both Tx and Rx intensive. There may be a variety of suitable mechanisms for determining if the data flow is transmission intensive, as is further described in detail in reference to block 306 below. There may be a variety of suitable mechanisms for determining if the data flow is receive intensive, as is further described in detail in reference to block 310 below. If it is determined, at block 304, that the data flow is both Tx and Rx intensive, then the method 300 may return to block 302, where the antenna may remain at the baseline setting, which may be that the antenna 130 is tuned at a frequency between the Rx channel 146 and the Tx channel 144. If, however, at block 304, it is determined that the data flow is not both Tx and Rx intensive, then the method 300 may proceed to block 306.

At block 306, it may be determined if the data flow is transmission intensive. In other words, it may be determined if the wireless communications system 102 is primarily operating to uplink/transmit data. There may be a variety of suitable mechanisms for determining if the data flow is transmission intensive. These mechanisms may include determining the occupancy (e.g., amount of data or percentage of total capacity) of the UL buffer 226 of the baseband processor 110, determining the historical and/or current amounts of data transmission by the wireless communications system 102, and/or identifying a number of UL grants by a base station with which the wireless communications system 102 is in communications.

In example embodiments, the amount of data stored in the UL buffer 226 may be compared to a corresponding respective threshold (e.g., either a percentage occupancy threshold and/or a raw data amount threshold) to determine if the data flow is transmission intensive. As a non-limiting example, the baseband it may be determined that the occupancy of the UL buffer 226 is 3.2 Megabytes (MB) and the corresponding threshold amount is 5 MB. In this non-limiting example, the UL buffer 226 occupancy fails to satisfy the threshold condition and, therefore, the wireless communications system 102 may be deemed to not be transmission intensive at the time when the UL buffer occupancy was checked.

In other example embodiments, the amount of data that is being transmitted via the Tx channel 144 may be determined and compared to a corresponding threshold value to predict if the wireless communications system 102 is likely to be transmission intensive. In some example embodiments, a moving average, a window summation/average, an infinite impulse response (IIR) filter, a finite impulse response (FIR) filter, and/or or the like, may be applied to a measure of the volume of data transmitted over time and the results may be compared to corresponding respective threshold values to identify if wireless communications system 102 is likely to be transmission intensive.

In still further example embodiments, a number of uplink (UL) grants by a base station with which the wireless communications system 102 is in communications may be identified and determine therefrom the likelihood of further data transmissions via the Tx channel 144. Further still, in example embodiments a message from the application processor(s) indicative of how much data is to be transmitted via the Tx channel 144 may be received and used to identify if the data flow is Tx intensive.

If it is determined, at block 306, that the data flow is Tx intensive, then at block 308, the antenna may be biased toward the Tx band. As discussed above, biasing the antenna toward the Tx channel 144 may entail generating and/or transmitting control signals to tune one or more tunable elements of the tuner 120 and/or the antenna 130. These tunable elements may correspond to a variable effective length of the antenna 130, a capacitance of a variable capacitance capacitor 200, 202, an inductance of a variable inductance inductor 204, or the like.

On the other hand, if at block 306 it is determined that the data flow is not Tx intensive, then the method 300 may proceed to block 310, where it may be determined if the data flow is receive (Rx) intensive. In other words, it may be determined if the wireless communications system 102 is operating primarily to downlink data. There may be a variety of suitable mechanisms for determining if the data flow is receive intensive. These mechanisms may include determining the occupancy (e.g., amount of data or percentage of total capacity) of the DL buffer 224 of the baseband processor 110, determining the historical and/or current amounts of data transmission by the wireless communications system 102, and/or identifying a number of downlink grants by a base station with which the wireless communications system 102 is in communications.

If it is determined, at block 310, that the data flow is not Rx intensive, then the method may return to block 302, where the antenna may be tuned to the baseline setting. As discussed above, in example embodiments, the baseline setting may be that the antenna 130 is biased between the Tx carrier frequency 144 and the Rx carrier frequency 146. If the antenna was, at some point biased away from the baseline setting, then new control signals corresponding to the baseline setting to tune tunable elements of the antenna 130 and/or the tuner 120 may be determined and provided to the corresponding tunable elements.

On the other hand, if it is determined, at block 310, that the data flow is indeed Rx intensive, then the antenna, at block 312, may be biased toward the Rx band. As discussed above, biasing the antenna toward the Rx channel 146 may entail generating and/or transmitting control signals to tune one or more tunable elements of the tuner 120 and/or the antenna 130.

It should be noted that the method 300 may be modified in various ways in accordance with certain embodiments. For example, one or more operations of the method 300 may be eliminated or executed out of order in other embodiments. Additionally, other operations may be added to the method 300 in accordance with other embodiments. It should also be noted that while the check for Tx intensive data flow (block 306) is depicted as occurring before the check for Rx intensive data flow (block 310), it will be appreciated that the two checks may occur substantially contemporaneously or the positions of the two checks may be reversed. In the latter case, according to example embodiments of the disclosure, the blocks 306 and 308 may be switched with blocks 310 and 312, respectively. It should also be noted that the method 300 may continue repeatedly, continuously, and/or periodically. As such, the element of dynamic tuning of the antenna 130 is possible by repeatedly determining if the current and/or future data flows are to be transmission intensive, receiving intensive, or neither transmission nor receiving intensive and adjusting the bias of the antenna 130 and/or tuner 120 accordingly.

Figure 4:
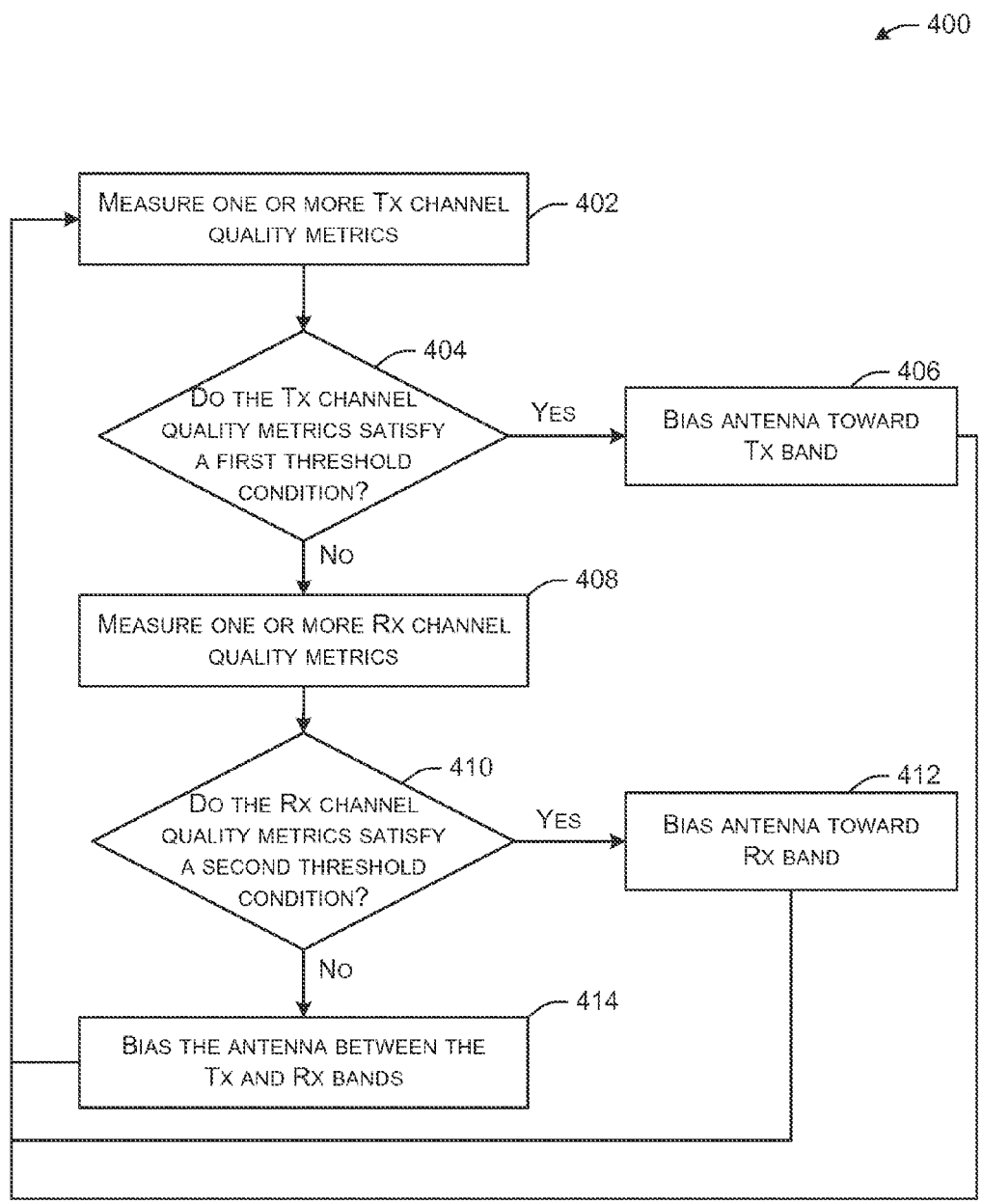
FIG. 4 is a flow diagram illustrating an example method for biasing the antenna of the wireless communications system of FIG. 1 based at least in part on channel quality metrics, in accordance with example embodiments of the disclosure.

FIG. 4 is a flow diagram illustrating example method 400 for biasing the antenna 130 of the wireless communications system 102 of FIG. 1 based at least in part on channel quality metrics, in accordance with example embodiments of the disclosure. The method 400 may be performed by the baseband processor 110 in conjunction with the tuner 120 and the antenna 130.

At block 402, one or more Tx channel quality metrics may be determined. In example embodiments, the Tx channel quality metrics may be measured. The Tx channel metrics may include, but are not limited to, channel quality indicator (CQI), rank indicator (RI), precoding matrix index (PMI), signal to noise ratio (SNR), bit error rate (BER), combinations thereof, or the like.

At block 404, it may be determined if the Tx channel quality metrics satisfy a first threshold condition. One, some, or all of the aforementioned Tx channel quality metrics may be thresholded against a respective corresponding threshold amount to determine if the Tx channel quality is such that the antenna 130 is to be tuned to the Tx channel 144. If it is determined that the Tx quality metrics do indeed satisfy the first threshold condition, then at block 406, the antenna 130 may be biased toward the Tx band 144.

On the other hand, if, at block 404, it is determined at block 404 that the Tx channel quality metrics do not satisfy a first threshold condition, then at block 408, one or more Rx channel quality metrics may be determined. In example embodiments, the Rx channel quality metrics may be measured by the baseband processor 110. The Rx channel metrics may include, but are not limited to, receive signal strength indicator (RSSI), reference signal receive power (RSRP), reference signal code power (RSCP), reference signal receive quality (RSRQ), bit error rate (BER), signal to noise ratio (SNR), block error rate (BLER), Ec/Io value, combinations thereof, or the like.

At block 410, it may be determined if the Rx channel quality metrics satisfy a second threshold condition. One, some, or all of these Rx channel quality metrics may be thresholded against a respective corresponding threshold amount to determine if the Rx channel quality is such that the antenna 130 is to be tuned to the Rx channel 146. If it is determined that the Rx channel quality metrics do satisfy the second threshold condition, then at block 412, the antenna may be biased toward the Rx band.

On the other hand, if at block 410, it is determined that the Rx channel parameters do not satisfy the second threshold condition, then at block 414, the antenna may be biased between the Tx and Rx bands. In other words, the tuner 120 may tune the antenna 130 within the frequency offset of the FDD communications channels 144, 146 being used. In some example embodiments, the antenna 130 may nominally be biased within the frequency offset and, as such, at block 414, the antenna may not be biased away from the nominal bias setting.

As discussed above, the antenna biasing may be a dynamic, continuous, and/or periodic process. Therefore, once the antenna has been biased toward the Tx band (block 406), the Rx band (block 412), or neither the Tx or Rx band (block 414) the method 400 may repeat to assess a relatively optimal antenna biasing for subsequent time periods.

It should be noted that the method 400 may be modified in various ways in accordance with certain embodiments. For example, one or more operations of the method 400 may be eliminated or executed out of order in other embodiments. Additionally, other operations may be added to the method 400 in accordance with other embodiments. It should also be noted that while the assessment of Tx channel quality (block 404) is depicted as occurring before the assessment of Rx channel quality (block 410), it will be appreciated that the two checks may occur substantially contemporaneously or the positions of the two checks may be reversed. In the latter case, according to example embodiments of the disclosure, the blocks 402, 404 and 406 may be switched with blocks 408, 410 and 412, respectively.

Figure 5:
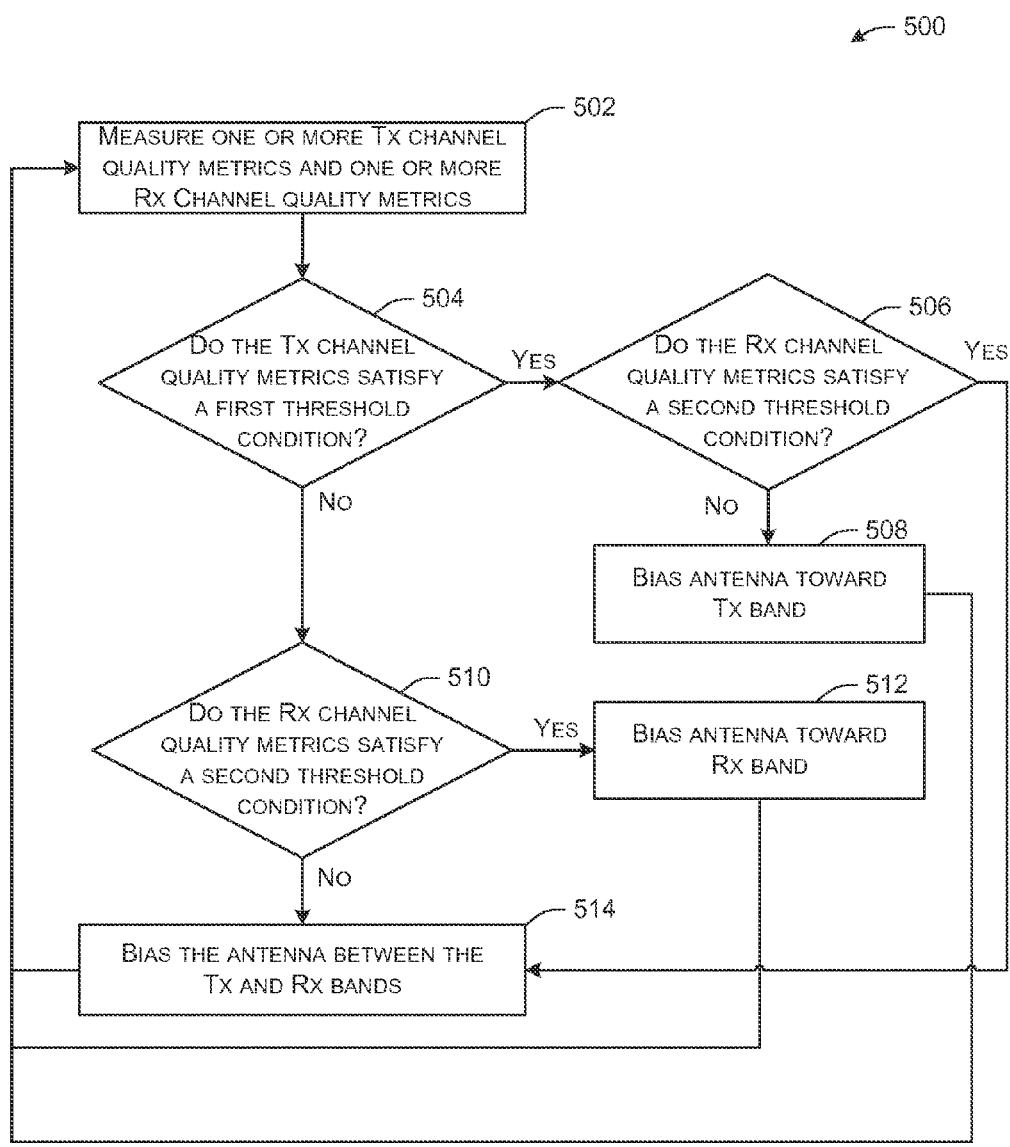
FIG. 5 is a flow diagram illustrating another example method for biasing the antenna of the wireless communications system of FIG. 1 based at least in part on channel quality metrics, in accordance with example embodiments of the disclosure.

FIG. 5 is a flow diagram illustrating another example method 500 for biasing the antenna of the wireless communications system of FIG. 1 based at least in part on channel quality metrics, in accordance with example embodiments of the disclosure. The method 500 may be performed by the baseband processor 110 in conjunction with the tuner 120 and the antenna 130. Method 500 may be similar to method 400 of FIG. 4, except that in the condition where both the Rx channel 146 and the Tx channel 144 quality may be degraded, the antenna 130 may be biased between the Rx channel 146 and the Tx channel 144.

At block 502, one or more Tx channel quality metrics and one or more Rx channel quality metrics may be determined. In example embodiments, the Tx channel quality metrics and the Rx channel quality may be measured by the baseband processor 110. The Rx channel metrics may include, but are not limited to, receive signal strength indicator (RSSI), reference signal receive power (RSRP), reference signal code power (RSCP), reference signal receive quality (RSRQ), bit error rate (BER), signal to noise ratio (SNR), block error rate (BLER), Ec/Io value, combinations thereof, or the like. The Tx channel metrics may include, but are not limited to, channel quality indicator (CQI), rank indicator (RI), precoding matrix index (PMI), signal to noise ratio (SNR), bit error rate (BER), combinations thereof, or the like.

At block 504, it may be determined if the Tx channel quality metrics satisfy a first threshold condition. One, some, or all of the aforementioned Tx channel quality metrics may be thresholded against a respective corresponding threshold amount to determine if the Tx channel quality is such that the antenna 130 is to be tuned to the Tx channel 144. If it is determined that the Tx quality metrics do indeed satisfy the first threshold condition, then at block 506, it may be determined if the Rx channel quality metrics satisfy a second threshold condition. One, some, or all of these Rx channel quality metrics may be thresholded against a respective corresponding threshold amount. If it is determined that the Rx channel quality metrics do not satisfy the second threshold condition, then the method 500 may proceed to block 508, where the antenna may be biased toward the Tx band. If, on the other hand, it is determined that the Rx channel quality metrics do satisfy the second threshold condition, then the method 500 may proceed to block 514, where the antenna may be biased between the Rx band and the Tx band. In this case, since both of the Tx channel quality metrics and the Rx channel quality metrics may indicate that the quality of the Tx channel and the Rx channel are relatively degraded, the antenna may not be biased to improve the quality of either channel, but rather left in a position where neither channel is degraded further by tuning the antenna 130 away from a particular one of the Rx channel 146 or the Tx channel 144.

At block 504, if it was determined that the Tx channel quality metrics do not satisfy the first threshold condition, then at block 510, it may be still be determined if the Rx channel quality metrics satisfy the second threshold condition. If the Rx channel quality metrics do satisfy the second threshold condition, then at block 512, the antenna may be biased toward the Rx band. On the other hand, if at block 510, it is determined that the Rx channel parameters do not satisfy the second threshold condition, then at block 514, the antenna may be biased between the Tx and Rx bands. In other words, the tuner 120 may tune the antenna 130 within the frequency offset of the FDD communications channels 144, 146 being used. In some example embodiments, the antenna 130 may nominally be biased within the frequency offset and, as such, at block 514, the antenna may not be biased away from the nominal bias setting.

As discussed above, the antenna biasing may be a dynamic, continuous, and/or periodic process. Therefore, once the antenna has been biased toward the Tx band (block 508), the Rx band (block 512), or neither the Tx or Rx band (block 514) the method 500 may repeat to assess a relatively optimal antenna biasing for subsequent time periods.

It should be noted that the method 500 may be modified in various ways in accordance with certain embodiments. For example, one or more operations of the method 500 may be eliminated or executed out of order in other embodiments. Additionally, other operations may be added to the method 500 in accordance with other embodiments.

Figure 6:
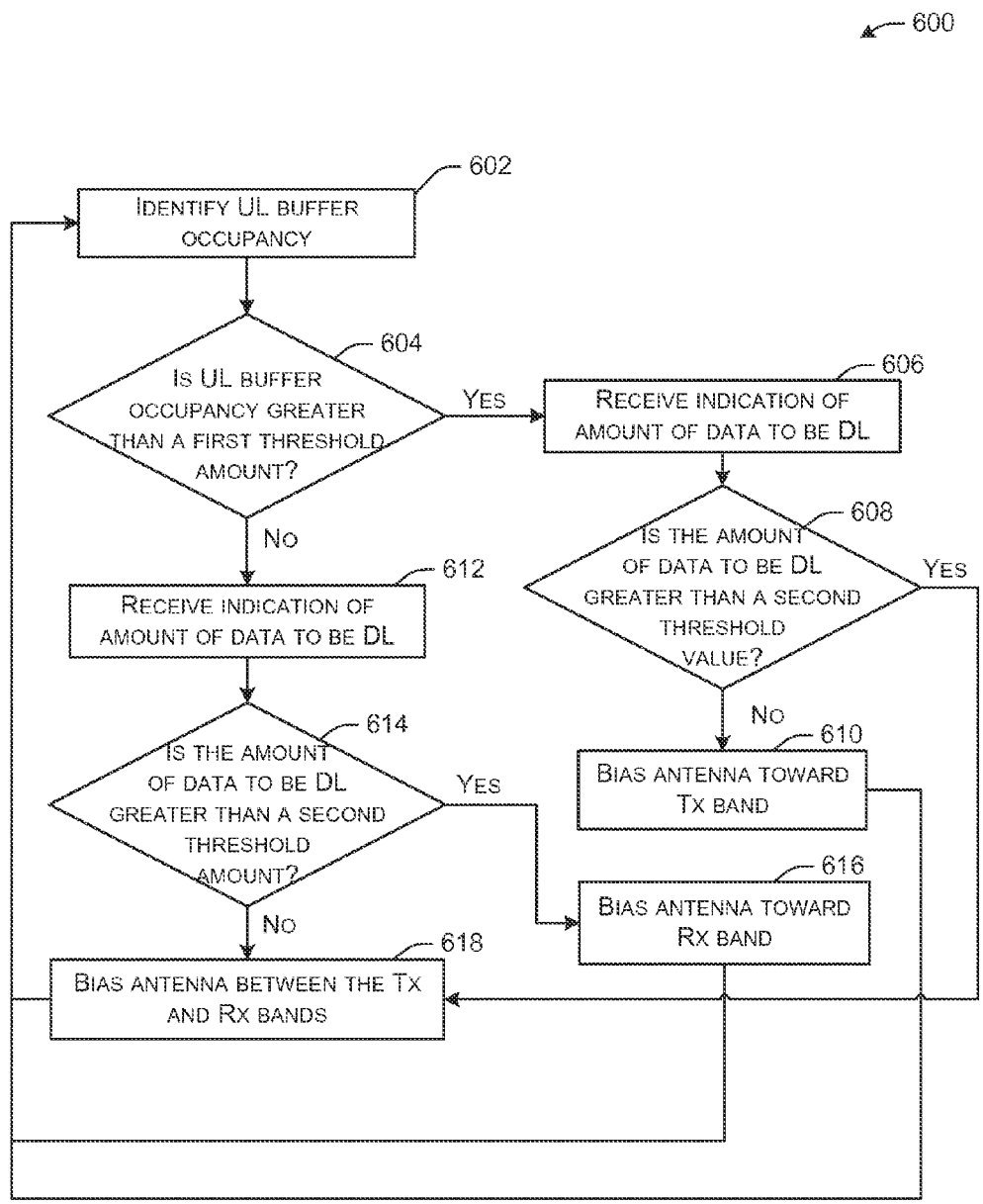
FIG. 6 is a flow diagram illustrating an example method for biasing the antenna of the wireless communications system of FIG. 1 based at least in part on expected amounts of data to transmit and/or receive, in accordance with example embodiments of the disclosure.

FIG. 6 is a flow diagram illustrating example method 600 for biasing the antenna of the wireless communications system of FIG. 1 based at least in part on expected amounts data to uplink (UL) and/or downlink (DL), in accordance with example embodiments of the disclosure. The method 600 may be performed by the baseband processor 110 in conjunction with the tuner 120 and the antenna 130.

At block 602, the UL buffer occupancy may be determined. The UL buffer occupancy may be determined as a total amount of data stored thereon and/or as a percentage of the total memory capacity of the UL buffer 226. This data may be accessed by the baseband processor 110 according to the mechanisms described above.

At block 604, it may be determined if the UL buffer occupancy is greater than a first threshold amount. It will be appreciated that in the case of the occupancy as measured as a total amount of UL data, the first threshold value may be a threshold amount of total data (e.g., 5 Mbits). Alternatively, if a percentage of the UL buffer is utilized in this method 600, then the first threshold amount may be a percentage of the UL buffer total capacity (e.g., 85% of UL buffer capacity). If the UL buffer capacity 226 is greater than the first threshold value, then the method 600 may proceed to block 606, where an indication of data to be DL may be received. In some cases, this indication may be received from an application processor, such as in the form of a message that indicates the expected amount of data to be downloaded in light of the applications that may be operating on the application processor that may be demanding data. Alternatively, the DL data amounts may be assessed by communications from a wireless communications network with which the wireless communications system 102 may be communicatively linked. The indication form the wireless communications network may include an indication of the number of DL assignments allotted by elements of the wireless communications network, such as a NodeB or eNodeB base station.

At block 608, it may be determined if the amount of data to be DL is greater than a second threshold value. If it is determined that the amount of data is not greater than the second threshold amount, then at block 610, the antenna may be biased toward the Tx band. If on the other hand, at block 610, it is determined that the amount of data to be DL is greater than the second threshold, then at block 618, the antenna may be biased at a frequency between the Tx channel frequency and the Rx channel frequency. In this case, both the Rx channel 146 and the Tx channel 144 may transfer a relatively high amount of data and, therefore, the antenna 130 may not be biased away from either of the Rx channel or the Tx channel.

If, on the other hand, it is determined at block 604 that the UL buffer occupancy is not greater than the first threshold value, then at block 612, an indication of data to be DL may be received. In other words, the baseband processor and the logic 210 thereon may receive an indication of how much data is expected to be downloaded or received by the wireless communication system 102. This mechanism may be similar to that described in conjunction with block 606.

At block 614, it may be determined if the amount of data to be DL is greater than a second threshold value. This process may be similar to the process of block 608. If it is determined that the amount of data is greater than the second threshold amount, then at block 616, the antenna may be biased toward the Rx band. If on the other hand, at block 614, it is determined that the amount of data to be DL is not greater than the second threshold, then at block 618, the antenna may be biased at a frequency between the Tx channel frequency and the Rx channel frequency.

As discussed above, the antenna biasing may be a dynamic, continuous, and/or periodic process. Therefore, once the antenna has been biased toward the Tx band (block 610), the Rx band (block 616), or neither the Tx or Rx band (block 618) the method 600 may repeat to assess a relatively optimal antenna biasing for subsequent time periods.

It should be noted that the method 600 may be modified in various ways in accordance with certain embodiments. For example, one or more operations of the method 600 may be eliminated or executed out of order in other embodiments. Additionally, other operations may be added to the method 600 in accordance with other embodiments.

Figure 7:
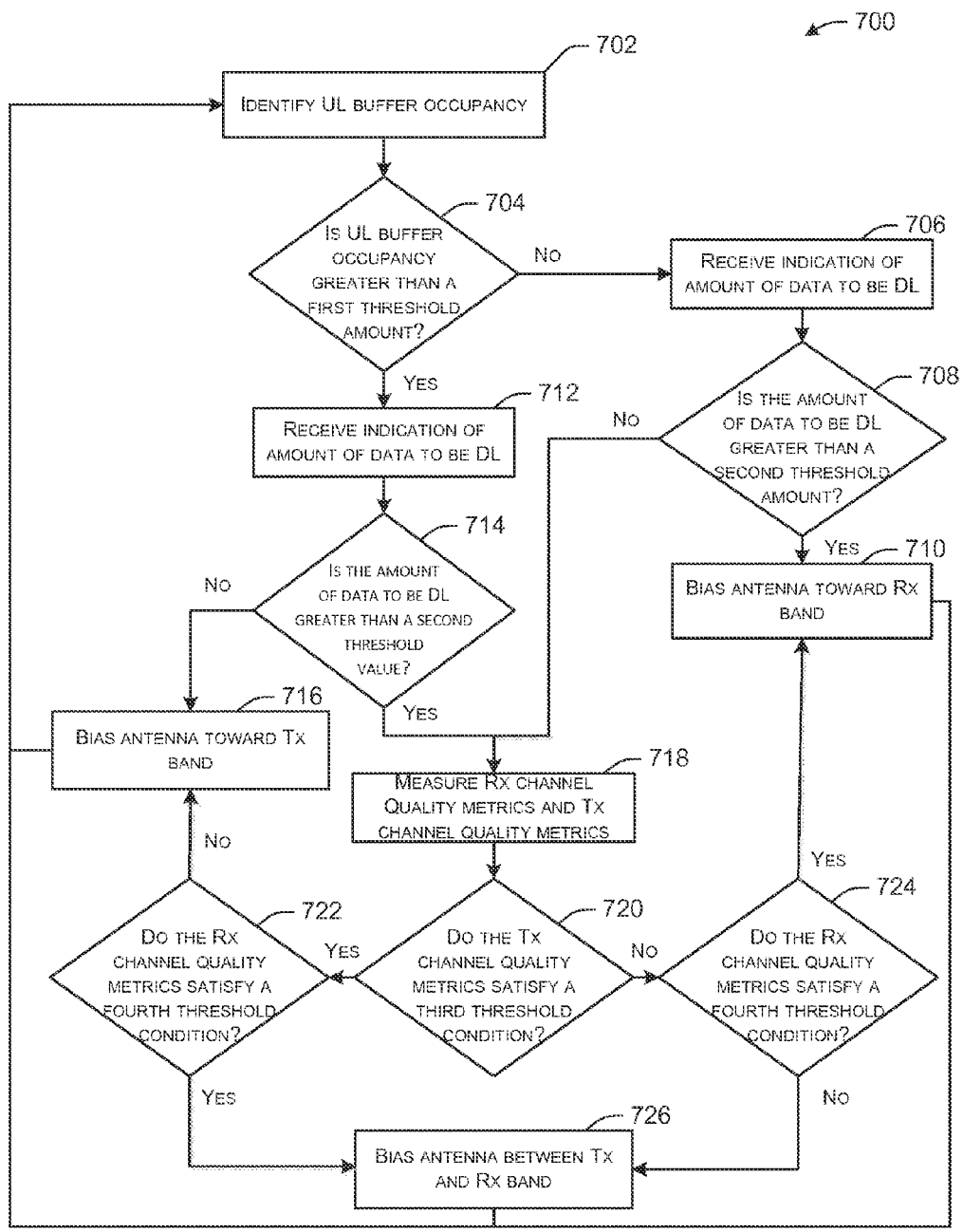
FIG. 7 is a flow diagram illustrating an example method for biasing the antenna of the wireless communications system of FIG. 1 based at least in part on expected amounts of data to transmit and/or receive, as well as transmit and receive channel quality, in accordance with example embodiments of the disclosure.

FIG. 7 is a flow diagram illustrating an example method 700 for biasing the antenna of the wireless communications system of FIG. 1 based at least in part on expected amounts of data to transmit and/or receive, as well as transmit and receive channel quality, in accordance with example embodiments of the disclosure. The method 700 may be performed by the baseband processor 110 in conjunction with the tuner 120 and the antenna 130.

At block 702, the UL buffer occupancy may be determined. The UL buffer occupancy may be determined as a total amount of data stored thereon and/or as a percentage of the total memory capacity of the UL buffer 226. This data may be accessed by the baseband processor 110 according to the mechanisms described above.

At block 704, it may be determined if the UL buffer occupancy is greater than a first threshold amount. It will be appreciated that in the case of the occupancy as measured as a total amount of UL data, the first threshold value may be a threshold amount of total data (e.g., 5 Mbits). Alternatively, if a percentage of the UL buffer is utilized in this method 700, then the first threshold amount may be a percentage of the UL buffer total capacity (e.g., 85% of UL buffer capacity). If the UL buffer capacity 226 is not greater than the first threshold amount, then the method 700 may proceed to block 706, where an indication of data to be DL may be received. In some cases, this indication may be received from an application processor, such as in the form of a message that indicates the expected amount of data to be downloaded in light of the applications that may be operating on the application processor that may be demanding data. Alternatively, the DL data amounts may be assessed by communications from a wireless communications network with which the wireless communications system 102 may be communicatively linked. The indication form the wireless communications network may include an indication of the number of DL assignments allotted by elements of the wireless communications network, such as a NodeB or eNodeB base station.

At block 708, it may be determined if the amount of data to be DL is greater than a second threshold value. If it is determined that the amount of data is not greater than the second threshold amount, then the method may proceed to block 718. On the other hand, if at block 708 it is determined that the amount of DL data is greater than the second threshold amount, then at block 710, the antenna may be biased toward the Rx band. If on the other hand, at block 710, it is determined that the amount of data to be DL is greater than the second threshold, then at block 718, the antenna may be biased at a frequency between the Tx channel frequency and the Rx channel frequency. In this case, both the Rx channel 146 and the Tx channel 144 may transfer a relatively high amount of data and, therefore, the antenna 130 may not be biased away from either of the Rx channel or the Tx channel.

If, on the other hand, it is determined at block 704 that the UL buffer occupancy is not greater than the first threshold value, then at block 712, an indication of data to be DL may be received. In other words, the baseband processor 110 and the logic 210 thereon may receive an indication of how much data is expected to be downloaded or received by the wireless communication system 102. This mechanism may be similar to that described in conjunction with block 706.

At block 714, it may be determined if the amount of data to be DL is greater than a second threshold value. This process may be similar to the process of block 708. If it is determined that the amount of data is not greater than the second threshold amount, then at block 716, the antenna may be biased toward the Tx band. If on the other hand, at block 714, it is determined that the amount of data to be DL is greater than the second threshold, then at block 718, one or more Tx channel quality metrics and one or more Rx channel quality metrics may be determined. It should be noted that, in example embodiments, this process of method 700 may be reached if the data flow is neither UL nor DL intensive, or if the data flow is both UL and DL intensive. In example embodiments, the Tx channel quality metrics and the Rx channel quality may be measured by the baseband processor 110. The Rx channel metrics may include, but are not limited to, receive signal strength indicator (RSSI), reference signal receive power (RSRP), reference signal code power (RSCP), reference signal receive quality (RSRQ), bit error rate (BER), signal to noise ratio (SNR), block error rate (BLER), Ec/Io value, combinations thereof, or the like. The Tx channel metrics may include, but are not limited to, channel quality indicator (CQI), rank indicator (RI), precoding matrix index (PMI), signal to noise ratio (SNR), bit error rate (BER), combinations thereof, or the like.

At block 720, it may be determined if the Tx channel quality metrics satisfy a third threshold condition. One, some, or all of the aforementioned Tx channel quality metrics may be thresholded against a respective corresponding threshold amount to determine if the Tx channel quality is such that the third threshold condition is met. If it is determined that the Tx quality metrics do indeed satisfy the third threshold condition, then at block 722, it may be determined if the Rx channel quality metrics satisfy a fourth threshold condition. One, some, or all of these Rx channel quality metrics may be thresholded against a respective corresponding threshold amount. If it is determined that the Rx channel quality metrics do not satisfy the second threshold condition, then the method 700 may proceed to block 716, where the antenna may be biased toward the Tx band. If, on the other hand, it is determined that the Rx channel quality metrics do satisfy the second threshold condition, then the method 700 may proceed to block 726, where the antenna may be biased between the Rx band and the Tx band. In this case, the UL/DL data flow may not justify tuning the antenna 130 to one channel or the other and since both of the Tx channel quality metrics and the Rx channel quality metrics may indicate that the quality of the Tx channel and the Rx channel are relatively degraded, the antenna 130 may not be biased to improve the quality of either channel, but rather left in a position where neither channel is degraded further by tuning the antenna 130 away from a particular one of the Rx channel 146 or the Tx channel 144.

At block 720, if it was determined that the Tx channel quality metrics do not satisfy the third threshold condition, then at block 724, it may be still be determined if the Rx channel quality metrics satisfy the fourth threshold condition. If the Rx channel quality metrics do satisfy the fourth threshold condition, then at block 710, the antenna may be biased toward the Rx band. On the other hand, if at block 724, it is determined that the Rx channel parameters do not satisfy the fourth threshold condition, then at block 726, the antenna may be biased between the Tx and Rx bands. In other words, the tuner 120 may tune the antenna 130 within the frequency offset of the FDD communications channels 144, 146 being used. In some example embodiments, the antenna 130 may nominally be biased within the frequency offset and, as such, at block 726, the antenna may not be biased away from the nominal bias setting.

As discussed above, the antenna biasing may be a dynamic, continuous, and/or periodic process. Therefore, once the antenna has been biased toward the Tx band (block 716), the Rx band (block 710), or neither the Tx or Rx band (block 726) the method 700 may repeat to assess a relatively optimal antenna biasing for subsequent time periods.

It should be noted that the method 700 may be modified in various ways in accordance with certain embodiments. For example, one or more operations of the method 700 may be eliminated or executed out of order in other embodiments. Additionally, other operations may be added to the method 700 in accordance with other embodiments.

Figure 8:
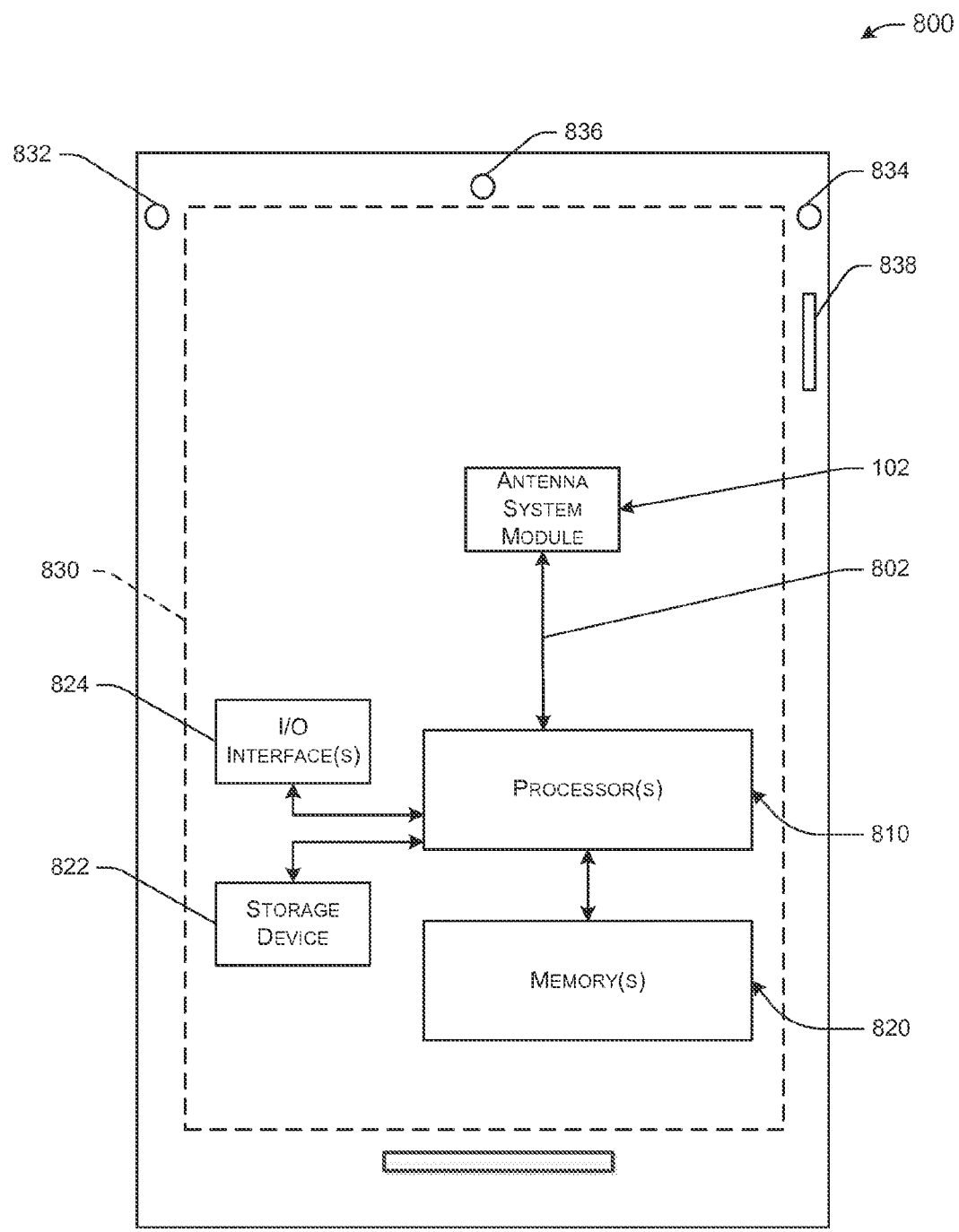
FIG. 8 is a block diagram illustrating an example user device incorporating the wireless communication system of FIG. 1, in accordance with example embodiments of the disclosure.

FIG. 8 is a block diagram illustrating an example user device 800 incorporating the wireless communication system of FIG. 1, in accordance with example embodiments of the disclosure. In operation, the user device 800 may include computer-readable and computer-executable instructions that reside on the user device 800, as is discussed further below. The user device 800 may include an address/data bus 802 for conveying data among components of the user device 800. Each component within the wireless communications system 102 may also be directly connected to other components in addition to (or instead of) being connected to other components across the bus 802.

The wireless communications system 102 may be included within the user device 800, such as a mobile communications device, a personal electronic device, an imaging system, or any device that may have wireless communications functionality, such as FDD-based communications functionality. Indeed, the user device 800 may be any one of suitable devices that may be configured to communicate data. The user device 800 may include, but is not limited to, a personal computer, a desktop computer, a notebook computer, a laptop computer, a personal digital assistant, an electronic book (ebook) reader, a tablet computing device, a pad computing device, a smartphone, wearable devices, or combinations thereof. The user device 800 may include one or more application processor(s) 810 and/or memory 820 to control and/or direct the transmission of data by the wireless communications system 102 and receiving of data by the wireless communications system 102.

In some example embodiments, the processors 810 of the user device 800 may be implemented as appropriate in hardware, software, firmware, or combinations thereof. Software or firmware implementations of the processors 810 may include computer-executable or machine-executable instructions written in any suitable programming language to perform the various functions described. Hardware implementations of the processors 810 may be configured to execute computer-executable or machine-executable instructions to perform the various functions described. The one or more processors 810 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 800 may also include a chipset (not shown) for controlling communication between the one or more processors 810 and one or more of the other components of the user device 800. The one or more processors 810 may also include one or more application specific integrated circuits (ASICs) or application specific standard products (ASSPs) for handling specific data processing functions or tasks.

The memory/storage 820 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, non-volatile magnetoresistive (MRAM), or combinations thereof.

The memory 820 may store program instructions that are loadable and executable on the processor(s) 810, as well as data generated or received during the execution of these programs. The memory 820 may include one or more operating systems (O/S) and one or more application software that may be executed by the processors 810 to control the user device 800 and the wireless communications system 102. The memory 820 may also provide temporary "working" storage at runtime for any applications being executed on the processors(s) 810. The computer instructions may be stored in a non-transitory manner in non-volatile memory 820, storage 822, or an external device. Alternatively, some or all of the executable instructions may be embedded in hardware or firmware in addition to or instead of software.

The user device 800 may include input/output device interfaces 824. A variety of components may be connected through the input/output device interfaces 824, such as a display or display screen 830 having a touch surface or touchscreen, an audio output device for producing sound, such as speaker(s) 832, one or more audio capture device(s), such as a microphone or an array of microphones 834, one or more image and/or video capture devices, such as the wireless communications system 102, one or more haptic units 838, and other components. The display 830, speaker(s) 832, microphone(s) 834, wireless communications system 102, haptic unit(s) 838, and other components may be integrated into the user device 600 or may be separate.

The display 830 may be a video output device for displaying images. The display 830 may be a display of any suitable technology, such as a liquid crystal display, an organic light emitting diode display, electronic paper, an electrochromic display, a cathode ray tube display, a pico-projector or other suitable component(s). The display 830 may also be implemented as a touchscreen and may include components such as electrodes and/or antennae for use in detecting stylus input events or detecting when a stylus is hovering above, but not touching, the display 830.

The input/output device interfaces 824 may also include an interface for an external peripheral device connection such as universal serial bus (USB), FireWire, Thunderbolt, Ethernet port or other connection protocol that may connect to one or more networks. The input/output device interfaces 824 may also include a connection to antenna 102 to connect one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The processor(s) 810, by executing instructions stored in the memory 820 and/or storage device 822 may be configured to control the operations of the wireless communications system 102, such as in conjunction with the baseband processor 110, as described above. In particular, the processor(s) 810 may be configured to provide the wireless communications system 102 with one or more data and/or control signals. The processor(s) 810 may further be configured to cause the baseband processor 110 of the wireless communication system 102 to transmit and/or receive communications data.

Embodiments may be provided as a computer program product including one or more non-transitory machine-readable storage media having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A mobile device, comprising:
   an antenna;
   a tuner coupled to the antenna and configured to tune a resonant frequency of the antenna;
   at least one memory that stores computer-executable instructions; and
   a baseband processor that accesses the at least one memory, wherein the baseband processor is configured to:

determine, at a first time, a first amount of data to be uploaded by the mobile device by determining a buffer occupancy of an uplink data buffer of the baseband processor;

determine that the first amount of data is less than a first threshold amount, wherein the first amount of data at or above the first threshold amount indicates that the mobile device is to operate in a transmit intensive mode;

receive, at substantially the first time, a message from an application processor indicating a second amount of data that is to be downloaded by the mobile device;

determine that the second amount of data is greater than a second threshold value, wherein the second amount of data at or above the second threshold amount indicates that the mobile device is to operate in a transmit intensive mode;

determine that the antenna is to be tuned to a receive channel carrier frequency of the mobile device;

cause the tuner to tune the antenna such that a bandwidth of the antenna encompasses the receive channel carrier frequency;

determine, at a second time after the first time, a third amount of data to be uploaded by the mobile device by determining the buffer occupancy of the uplink data buffer of the baseband processor;

determine that the third amount of data is greater than the first threshold amount;

determine that the antenna is to be tuned to a transmit channel carrier frequency of the mobile device by determining that the third amount of data is greater than the first threshold amount; and cause the tuner to tune the antenna such that the bandwidth of the antenna encompasses the transmit channel carrier frequency.

2. The mobile device of claim 1, wherein the baseband processor is further configured to:

determine, at a third time after the second time, a fourth amount of data to be uploaded by the mobile device by determining the buffer occupancy of the uplink data buffer of the baseband processor;

determine, at substantially the third time, that the fourth amount of data is less than a first threshold value;

receive, at substantially the third time, a second message from an application processor indicating a fifth amount of data that is to be downloaded by the mobile device;

determine, at substantially the third time, that the fifth amount of data is less than the second threshold value;

determine, at substantially the third time, that the antenna is to be tuned to a frequency value that is between the receive channel carrier frequency and the transmit channel carrier frequency of the mobile device; and cause, at substantially the third time, the tuner to be tuned to the frequency value that is between the receive channel and transmit channel such that the bandwidth of the antenna encompasses the frequency value that is between the receive channel carrier frequency and the transmit channel carrier frequency of the mobile device.

3. The mobile device of claim 1, wherein to determine that the antenna is to be tuned to the receive channel carrier frequency the baseband processor is further configured to:

determine a receive signal strength indicator (RSSI) associated with the receive channel carrier frequency; and determine that the RSSI satisfies a first threshold condition.

4. The mobile device of claim 1, wherein to determine that the antenna is to be tuned to the receive channel carrier frequency the baseband processor is further configured to:

determine a bit error rate (BER) corresponding to the transmit channel carrier frequency; and determine that the BER satisfies a first threshold condition.

5. A method, comprising:

determining, by a user device, a first amount of data to be received by the user device;

determining, by the user device, that the first amount of data fails to satisfy a first threshold condition;

determining, by the user device, a second amount of data to be transmitted by the user device;

determining, by the user device, that the second amount of data satisfies a second threshold condition; and tuning, by the user device, an antenna of the user device such that a bandwidth of the antenna encompasses a transmit channel carrier frequency.

6. The method of claim 5, wherein determining the first amount of data to be received by the user device comprises at least one of:

receiving a message from an application processor that indicates data to be downloaded;

estimating using an amount of data downloaded over a preceding predetermined period of time; or determining a number of downlink grants offered by a base station.

7. The method of claim 5, wherein determining the second amount of data comprises determining a percentage of an uplink data buffer capacity occupied by data to be transmitted, and wherein determining that the second amount of data satisfies the second threshold condition comprises determining that the percentage of the uplink buffer capacity occupied is greater than a buffer capacity threshold percentage.

8. The method of claim 5, wherein tuning the antenna comprises generating a control signal to tune at least one of:

a variable capacitor coupled to the antenna; or a variable inductor coupled to the antenna.

9. The method of claim 5, wherein tuning the antenna is performed at a first time and the method further comprising:

determining, by the user device at a second time, a third amount of data to be received by the user device;

determining, by the user device at substantially the second time, that the third amount of data fails to satisfy the first threshold condition;

determining, by the user device at substantially the second time, a fourth amount of data to be sent by the user device;

determining, by the user device at substantially the second time, that the fourth amount of data fails to satisfy the second threshold condition; and tuning, by the user device at substantially the second time, the antenna such that the bandwidth of the antenna is within a frequency between the transmit channel carrier frequency and a receive channel carrier frequency.

10. The method of claim 5, wherein tuning the antenna is performed at a first time and the method further comprising:

determining, by the user device at a second time, a third amount of data to be received by the user device;

determining, by the user device at substantially the second time, that the third amount of data satisfies the first threshold condition; and tuning, by the user device at substantially the second time, the antenna such that the bandwidth of the antenna encompasses a receive channel carrier frequency.

11. The method of claim 10, wherein tuning the antenna such that the bandwidth of the antenna encompasses the receive channel carrier frequency further comprises determining at least one receive channel quality metric, wherein the receive channel quality metric includes at least one of:
- a receive signal strength indicator (RSSI);
- a reference signal receive power (RSCP);
- a reference signal code power (RSCP);
- a reference signal receive quality (RSRQ);
- a bit error rate (BER);
- a signal to noise ratio (SNR);
- a block error rate (BLER); or
- an Ec/Io value; and
- determining that the at least one receive channel quality metric meets a first channel quality threshold condition.

12. The method of claim 5, wherein tuning the antenna such that the bandwidth of the antenna encompasses the transmit channel carrier frequency further comprises determining at least one receive channel quality metric, wherein the receive channel quality metric includes at least one of:
- a channel quality indicator (CQI);
- a rank indicator (RI);
- a precoding matrix index (PMI);
- a signal to noise ratio (SNR); or
- a bit error rate (BER); and
- determining that the at least one receive channel quality metric meets a second channel quality threshold condition.

13. A mobile device, comprising:
- an antenna;
- a tuner coupled to the antenna and configured to tune a resonant frequency of the antenna;
- at least one memory that stores computer-executable instructions; and
- a processor that accesses the at least one memory, wherein the processor is configured to:
  - determine a first amount of data to be received by the mobile device;
  - determine that the first amount of data fails to satisfy a first threshold condition;
  - determine a second amount of data to be transmitted by the mobile device;
  - determine that the second amount of data satisfies a second threshold condition; and
  - cause the tuner to tune the antenna such that a bandwidth of the antenna encompasses a transmit channel carrier frequency.

14. The mobile device of claim 13, wherein the processor is configured to determine the first amount of data to be received by the mobile device by:
- receiving a message from an application processor that indicates data to be received;
- estimating using an amount of data received over a preceding predetermined period of time; or
- determining a number of downlink grants offered by a base station.

15. The mobile device of claim 13, wherein the processor is configured to determine the second amount of data by determining a percentage of an uplink data buffer capacity occupied by data to be transmitted, and wherein the processor is configured to determine that the second amount of data satisfies the second threshold condition by determining that the percentage of the uplink buffer capacity occupied is greater than a buffer capacity threshold percentage.

16. The mobile device of claim 13, wherein the processor is configured to cause the tuner to tune the antenna by generating a control signal to tune at least one of:
- a variable capacitor coupled to the antenna; or
- a variable inductor coupled to the antenna.

17. The mobile device of claim 13, wherein the processor is configured to cause the tuner to tune the resonant frequency of the antenna at a first time, and the processor is further configured to:
- determine, at a second time, a third amount of data to be received by the mobile device;
- determine, at the second time, that the third amount of data fails to satisfy the first threshold condition;
- determine, at the second time, a fourth amount of data to be transmitted by the mobile device;
- determine, at the second time, that the fourth amount of data fails to satisfy the second threshold condition; and
- cause the tuner to tune, at the second time, the antenna such that the bandwidth of the antenna is within a frequency between the transmit channel carrier frequency and a receive channel carrier frequency.

18. The mobile device of claim 13, wherein the processor is configured to cause the tuner to tune the resonant frequency of the antenna at a first time, and the processor is further configured to:
- determine, at a second time, a third amount of data to be received by the mobile device;
- determine, at the second time, that the third amount of data satisfies the first threshold condition; and
- cause the tuner to tune, at the second time, the antenna such that the bandwidth of the antenna encompasses a receive channel carrier frequency.

19. The mobile device of claim 18, wherein the processor is configured to cause the tuner to tune the antenna such that the bandwidth of the antenna encompasses the receive channel carrier frequency by determining at least one receive channel quality metric, wherein the receive channel quality metric includes at least one of:
- a receive signal strength indicator (RSSI);
- a reference signal receive power (RSCP);
- a reference signal code power (RSCP);
- a reference signal receive quality (RSRQ);
- a bit error rate (BER);
- a signal to noise ratio (SNR);
- a block error rate (BLER); or
- an Ec/Io value; and
- by determining that the at least one receive channel quality metric meets a first channel quality threshold condition.

20. The mobile device of claim 13, wherein the processor is configured to cause the tuner to tune the antenna such that the bandwidth of the antenna encompasses the transmit channel carrier frequency by determining at least one receive channel quality metric, wherein the receive channel quality metric includes at least one of:
- a channel quality indicator (CQI);
- a rank indicator (RI);
- a precoding matrix index (PMI);
- a signal to noise ratio (SNR); or
- a bit error rate (BER); and
- by determining that the at least one receive channel quality metric meets a second channel quality threshold condition.

* * * * *